US010922250B2

(12) United States Patent
Caulfield et al.

(10) Patent No.: US 10,922,250 B2
(45) Date of Patent: Feb. 16, 2021

(54) MONITORING AND STEERING SERVICE REQUESTS TO ACCELERATION COMPONENTS

(71) Applicant: Microsoft Technology Licensing, LLC, Redmond, WA (US)

(72) Inventors: Adrian M. Caulfield, Woodinville, WA (US); Michael Papamichael, Redmond, WA (US); Alexey Lavrov, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/398,512

(22) Filed: Apr. 30, 2019

(65) Prior Publication Data

US 2020/0349098 A1 Nov. 5, 2020

(51) Int. Cl.
*G06F 13/20* (2006.01)
*H04L 29/08* (2006.01)

(52) U.S. Cl.
CPC .............. *G06F 13/20* (2013.01); *H04L 67/10* (2013.01)

(58) Field of Classification Search
CPC combination set(s) only.
See application file for complete search history.

(56) References Cited

U.S. PATENT DOCUMENTS

| 6,092,115 | A * | 7/2000 | Choudhury | ............ H04L 47/52 709/235 |
| 6,657,954 | B1 * | 12/2003 | Bird | ........................ H04L 47/10 370/229 |
| 7,243,354 | B1 * | 7/2007 | Chhabra | ................. G06F 9/546 718/100 |
| 10,320,677 | B2 | 6/2019 | Caulfield et al. | |
| 10,326,696 | B2 | 6/2019 | Caulfield et al. | |

(Continued)

FOREIGN PATENT DOCUMENTS

WO 2018136190 A1 7/2018

OTHER PUBLICATIONS

"International Search Report and Written Opinion Issued in PCT Application No. PCT/US2020/026458", dated Jun. 29, 2020, 13 Pages.

*Primary Examiner* — Raymond N Phan
(74) *Attorney, Agent, or Firm* — Ranjeev Singh; Singh Law, PLLC

(57) ABSTRACT

Systems and methods for monitoring and steering service requests to acceleration components are provided. An example method in a system comprising a host configured to send messages, corresponding to a service, to any of a set of acceleration components may include tracking an input buffer occupancy corresponding to each of the set of acceleration components. The method may further include, upon a first input buffer occupancy of a first acceleration component from among the set of the acceleration components meeting a predetermined criterion, generating a first penalty value for the first acceleration component based at least on the first input buffer occupancy associated with the first acceleration component, and comparing a second value indicative of an availability of the second acceleration component to receive messages from the host to a second dynamically updated value to determine whether the host can send a next message to the second acceleration component.

20 Claims, 9 Drawing Sheets

(56) References Cited

U.S. PATENT DOCUMENTS

| | | | | |
|---|---|---|---|---|
| 2002/0087720 A1* | 7/2002 | Davis | H04L 69/22 | 709/238 |
| 2002/0150049 A1* | 10/2002 | Collier | H04L 47/29 | 370/236 |
| 2003/0035373 A1* | 2/2003 | Bass | H04L 47/30 | 370/230.1 |
| 2004/0032827 A1* | 2/2004 | Hill | H04L 49/50 | 370/229 |
| 2004/0109411 A1* | 6/2004 | Martin | H04L 47/10 | 370/229 |
| 2004/0120334 A1* | 6/2004 | Nation | H04L 47/266 | 370/412 |
| 2006/0114828 A1* | 6/2006 | Hsu | H04L 49/9047 | 370/235 |
| 2008/0276029 A1* | 11/2008 | Haraden | G01R 31/318519 | 710/305 |
| 2011/0320651 A1* | 12/2011 | Poublan | G06F 5/12 | 710/53 |
| 2013/0259063 A1* | 10/2013 | Thottan | H04L 49/9005 | 370/419 |
| 2014/0325524 A1 | 10/2014 | Zangaro et al. | | |
| 2016/0379109 A1* | 12/2016 | Chung | G06N 3/0454 | 706/26 |
| 2017/0364461 A1* | 12/2017 | Croxford | G06F 13/1673 | |

* cited by examiner

US 10,922,250 B2

MONITORING AND STEERING SERVICE REQUESTS TO ACCELERATION COMPONENTS

BACKGROUND

Increasingly, users access applications offered via computing, networking, and storage resources located in a data center. These applications run in a distributed computing environment, which is sometimes referred to as the cloud computing environment. Computer servers in a data center are interconnected via a network and thus the applications running on the computer servers can communicate with each other via the network. In large data centers the communication of messages among the computer servers can cause congestion in the network resulting in poor performance.

Thus, there is a need for methods and systems that alleviate at least some of these issues.

SUMMARY

In one example, the present disclosure relates to a method in a system comprising a host configured to send messages, corresponding to a service, to any of a set of acceleration components. The method may include tracking an input buffer occupancy corresponding to each of the set of acceleration components. The method may further include, upon a first input buffer occupancy of a first acceleration component from among the set of the acceleration components meeting a predetermined criterion, generating a first penalty value for the first acceleration component based at least on the first input buffer occupancy associated with the first acceleration component, and comparing a second value indicative of an availability of the second acceleration component to receive messages from the host to a second dynamically updated value to determine whether the host can send a next message to the second acceleration component.

In another example, the present disclosure relates to a system comprising a set of acceleration components and a host, configured to send messages, corresponding to a service, to any of a set of acceleration components. The system may further include a load-balancer configured to: (1) track an input buffer occupancy corresponding to each of the set of acceleration components, and (2) upon a first input buffer occupancy of a first acceleration component from among the set of the acceleration components meeting a predetermined criterion, generate a first penalty value for the first acceleration component based at least on the first input buffer occupancy associated with the first acceleration component, and compare a second value indicative of an availability of the second acceleration component to receive messages from the host to a second dynamically updated value to determine whether the host can send a next message to the second acceleration component.

In yet another example, the present disclosure relates to a method in a system comprising a host configured to send messages, corresponding to a service, to any of a set of acceleration components. The method may include tracking an input buffer occupancy and a processing rate corresponding to each of the set of acceleration components. The method may further include the host initiating a transmission of a first message to a first acceleration component selected from among the set of acceleration components as long as, based on a comparison of a first value indicative of an availability of the first acceleration component with a first dynamically updated value, the first acceleration component is determined to be in a healthy state. The method may further include, upon a first input buffer occupancy of the first acceleration component meeting a predetermined criterion, generating a first penalty value for the first acceleration component based at least on the first input buffer occupancy and a first processing rate associated with the first acceleration component, and comparing a second value indicative of an availability of a second acceleration component to receive messages from the host to a second dynamically updated value to determine whether the host can send a next message to the second acceleration component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
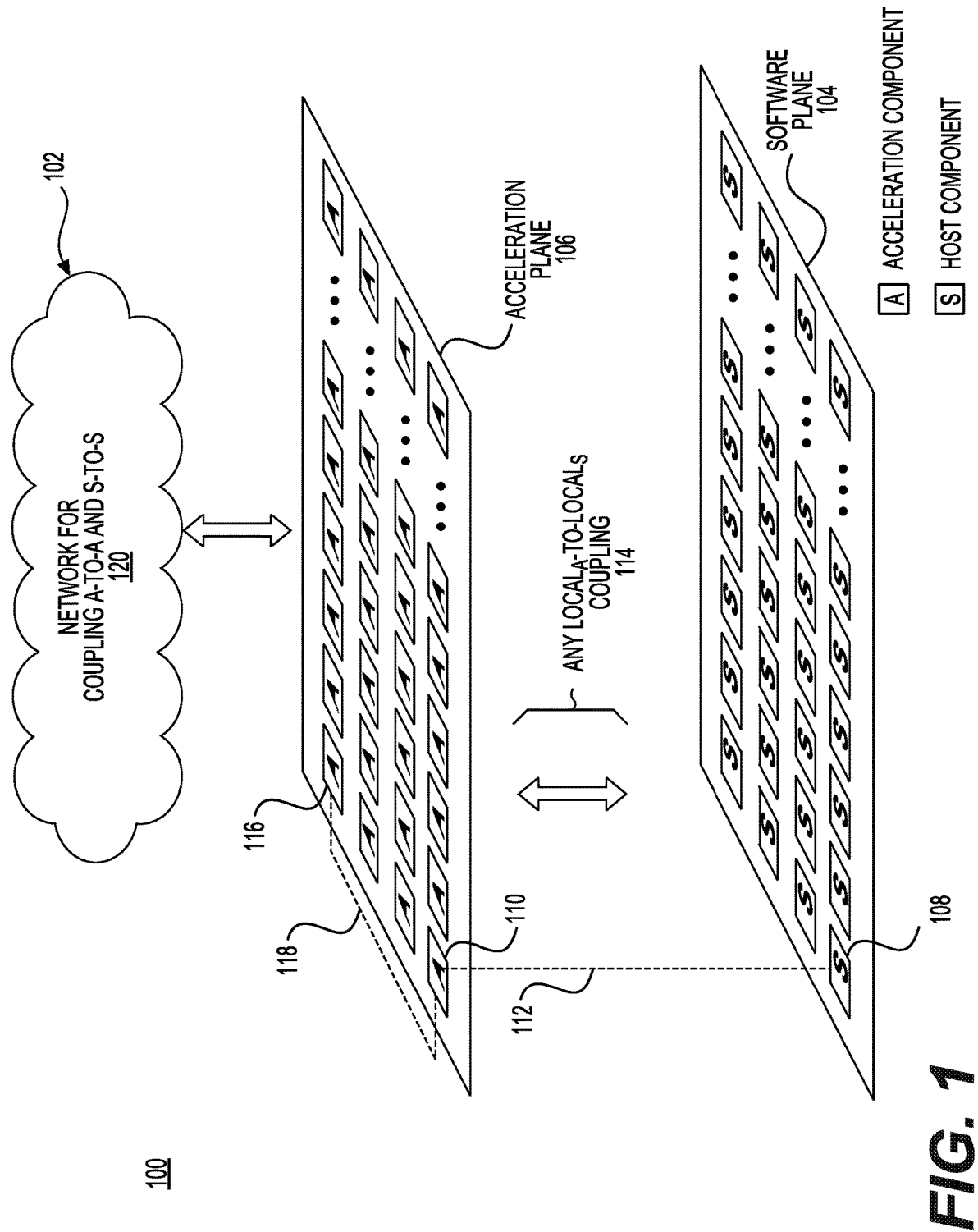
FIG. 1 is a diagram of an architecture that may include a software plane and an acceleration plane in accordance with one example.

Examples described in this disclosure relate to methods and systems that provide for management of messages among acceleration components configurable to accelerate a service. Certain aspects of the present disclosure relate to monitoring and steering of service requests to acceleration components. An acceleration component includes, but is not limited to, a hardware component configurable (or configured) to perform a function corresponding to a service being offered by, for example, a data center more efficiently than software running on a general-purpose central processing unit (CPU). Acceleration components may include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices. An image file may be used to configure or re-configure acceleration components such as FPGAs. Information included in an image file can be used to program hardware components of an acceleration component (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

A data center deployment may include a hardware acceleration plane and a software plane. The hardware acceleration plane can include a plurality of networked acceleration components (e.g., FPGAs). The software plane can include a plurality of networked software implemented host components (e.g., central processing units (CPUs)). A network infrastructure can be shared between the hardware acceleration plane and the software plane. In some environments, software-implemented host components are locally linked to corresponding acceleration components. Acceleration components may communicate with each other via a network protocol. To provide reliable service to a user of the service being offered via a data center, any communication mechanisms may be required to meet certain performance requirements, including reliability. In certain examples, the present disclosure provides for a lightweight transport layer for meeting such requirements. In one example, the acceleration components may communicate with each other via a Lightweight Transport Layer (LTL).

An application running on a host may send a request to perform a task to a group of acceleration components. Once the computation required by the request is completed, a response may be sent to the application. Certain tasks have strict real-time requirements, therefore imposing constraints on processing time for the acceleration components. Each of the acceleration components in the group is independent from each other but may perform the same computation, and thus be uniform from an application point of view. However, from the hardware point of view, each acceleration component can be in a different state and may even have varying processing speeds. This non-uniform behavior can be caused by power throttling, hardware errors, over-loading of certain nodes, or by the differences in the hardware associated with the acceleration components. This non-uniform behavior can be a problem for time-critical applications.

One metric for evaluating time-critical applications is tail latency, which may indicate the maximum time spent to process a single request for a given percentile of all requests. In an ideal scenario, to keep the tail-latency low, every request may be directed to the node which can produce a response in the shortest time. In practice, however, in a distributed computing environment, the ideal outcome is difficult to achieve. To get a task performed, software associated with a particular service may pick the acceleration component at the head of a round-robin queue or some other type of queue. Next, a message may be sent to that acceleration component. While the software may include some monitoring of the acceleration components to ensure that the software does not send the message to an acceleration component that is out of service or is not part of the group, any status updates about the acceleration component incur significant latency introduced by the network, the interconnect with the acceleration component, and the device driver(s). In addition, if an acceleration component develops a problem after the message has already been sent to the acceleration component, the software corresponding to the service may not learn about the failure until it receives an indication of the failed message from the pertinent acceleration component. As an example, an acceleration component may be subjected to thermal throttling, but the software corresponding to the service may not be aware of this until after it has already sent the service request to that acceleration component. Thus, in deciding which acceleration component should receive the next request, the software may use stale information about the system.

Certain examples associated with the present disclosure relate to monitoring and steering service requests using a load-balancer. An example hardware unit for load-balancing may be designed to collect information from processing nodes (e.g., acceleration components) and to react to state changes depending on its configuration. Any processing node (e.g., an acceleration component) can be disabled by a load-balancer based on a collected information for a specified time and enabled by specified events. All requests which are monitored by the load-balancer and which are directed to the processing nodes under the load-balancers control are subject to load-balancing. In one example, load balancing may be performed by checking the target processing node of a request and deciding if it should be changed depending on the state of the target node. In the case when a target processing node is changed by the load-balancer, an alternative processing node may be chosen using an algorithm. Thus, while the software associated with the service selects the original destination for the request (e.g., based on a round-robin scheme), the load-balancer can swap out the destination node without the software knowing about it. In this manner, the requests from the service can be re-vectored transparently.

FIG. 1 shows architecture 100 that may include a software plane 104 and an acceleration plane 106 in accordance with one example. The software plane 104 may include a collection of software-driven host components (each denoted by the symbol "S") while the acceleration plane may include a collection of acceleration components (each denoted by the symbol "A"). In this example, each host component may correspond to a server computer that executes machine-readable instruction using one or more central processing units (CPUs). In one example, these instructions may correspond to a service, such as a text/image/video search service, a translation service, or any other service that may be configured to provide a user of a device a useful result. Each CPU may execute the instructions corresponding to the various components (e.g., software modules or libraries) of the service. Each acceleration component may include hardware logic for implementing functions, such as, for example, portions of services offered by a data center.

Acceleration plane 106 may be constructed using a heterogenous or a homogenous collection of acceleration components, including different types of acceleration components and/or the same type of acceleration components with different capabilities. For example, acceleration plane 106 may include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), other types of programmable hardware logic devices and so on. Acceleration plane 106 may provide a reconfigurable fabric of acceleration components.

A host component may generally be any compute component that may perform operations by using each of its CPU hardware threads to execute machine-readable instructions. An acceleration component may perform operations using several parallel logic elements to perform computational tasks. As an example, an FPGA may include several gate arrays that may be configured to perform certain computational tasks in parallel. Thus, an acceleration component can perform some operations in less time compared to a software-driven host component. In the context of the architecture 100, the "acceleration" reflects its potential for accelerating the functions that are performed by the host components.

In one example, architecture 100 may correspond to a data center environment that includes a large number of servers. The servers may correspond to the host components in software plane 104. In another example, architecture 100 may correspond to an enterprise system. In a further example, architecture 100 may correspond to a user device or appliance which uses at least one host component that has access to two or more acceleration components. Indeed, depending upon the requirements of a service, other implementations for architecture 100 are also possible.

Network 120 may couple host components in software plane 104 to the other host components and couple acceleration components in acceleration plane 106 to other acceleration components. In this example, host components can use network 120 to interact with one another and acceleration components can use network 120 to interact with one another. Interaction among host components in software plane 104 may be independent of the interaction among acceleration components in acceleration plane 106. In this example, two or more acceleration components may communicate in a transparent manner relative to host components in software plane 104, outside the direction of the host components, and without the host components being "aware" of a particular interaction even taking place in acceleration plane 106.

Architecture 100 may use any of a variety of different protocols to facilitate communication among acceleration components over network 120 and can use any of a variety of different protocols to facilitate communication between host components over network 120. For example, architecture 100 can use Ethernet protocol to transmit Internet Protocol (IP) packets over network 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to acceleration plane 106 can be distinguished from packets belonging to software plane 104 based on the value of a status flag in each of the packets. In one example, architecture 100 can be viewed as two logical networks (software plane 104 and acceleration plane 106) that may share the same physical network communication links. Packets associated with the two logical networks may be distinguished from each other by their respective traffic classes.

In another aspect, each host component in the architecture 100 is coupled to at least one acceleration component in acceleration plane 104 through a local link. For example, a host component and acceleration component can be arranged together and maintained as a single serviceable unit (e.g., a server) within architecture 100. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 100, host component 108 may be coupled to acceleration component 110 through local link 112 (e.g., a Peripheral Component Interconnect Express (PCIe) link). Thus, host component 108 may be a local host component from the perspective of acceleration component 110 and acceleration component 110 may be a local acceleration component from the perspective of host component 108. The local linking of host component 108 and acceleration component 110 can form part of a server. More generally, host components in software plane 104 can be locally coupled to acceleration components in acceleration plane 106 through many individual links collectively represented as a $local_A$-to-$local_S$ coupling 114. In this example, a host component can interact directly with any locally linked acceleration components. A host component can initiate communication to a locally linked acceleration component to cause further communication among multiple acceleration components. For example, a host component can issue a request for a service (or portion thereof) where functionality for the service, or portion thereof, is composed across a group of one or more acceleration components in acceleration plane 106. A host component can also interact indirectly with other acceleration components in acceleration plane 106 to which the host component is not locally linked. For example, host component 108 can indirectly communicate with acceleration component 116 via acceleration component 110. In this example, acceleration component 110 communicates with acceleration component 116 via a link 118 of a network (e.g., network 120).

Acceleration components in acceleration plane 106 may advantageously be used to accelerate larger scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times. Although FIG. 1 shows a certain number of components of architecture 100 arranged in a certain manner, there could be more or fewer number of components arranged differently. In addition, various components of architecture 100 may be implemented using other technologies as well.

Figure 2:
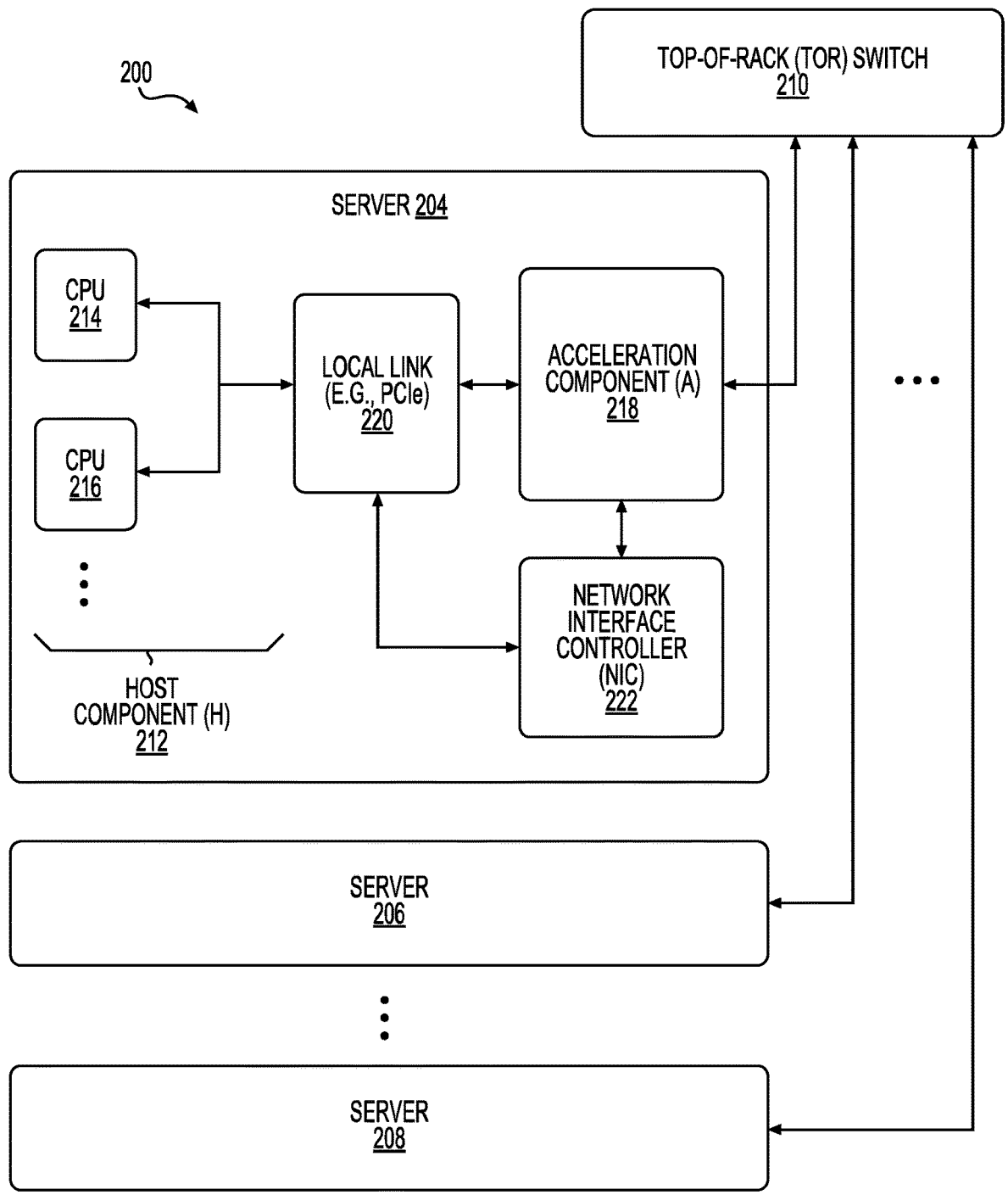
FIG. 2 shows a diagram of a system for transmission of messages by acceleration components configured to accelerate a service in accordance with one example.

FIG. 2 shows a diagram of a system 200 for transmission or retransmission of messages by acceleration components configured to accelerate a service in accordance with one example. In one example, system 200 may be implemented as a rack of servers in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 may further include host component 212 including CPUs 214, 216, etc. Host component 212 along with host components from servers 206 and 208 can be included in software plane 104. Server 204 may also include acceleration component 218. Acceleration component 218 along with acceleration components from servers 206 and 208 can be included in acceleration plane 106.

Acceleration component 218 may be directly coupled to a host component 212 via local link 220 (e.g., a PCIe link). Thus, acceleration component 218 can view host component 212 as a local host component. Acceleration component 218 and host component 212 may also be indirectly coupled by way of network interface controller 222 (e.g., used to communicate across network infrastructure 120). In this example, server 204 can load images representing service functionality onto acceleration component 218.

Acceleration component 218 may also be coupled to TOR switch 210. Hence, in system 200, acceleration component 218 may represent the path through which host component 212 interacts with other components in the data center (including other host components and other acceleration components). System 200 allows acceleration component 218 to perform processing on packets that are received from (and/or sent to) TOR switch 210 (e.g., by performing encryption, compression, etc.), without burdening the CPU-based operations performed by host component 212. Although FIG. 2 shows a certain number of components of system 200 arranged in a certain manner, there could be more or fewer number of components arranged differently. In addition, various components of system 200 may be implemented using other technologies as well.

Figure 3:
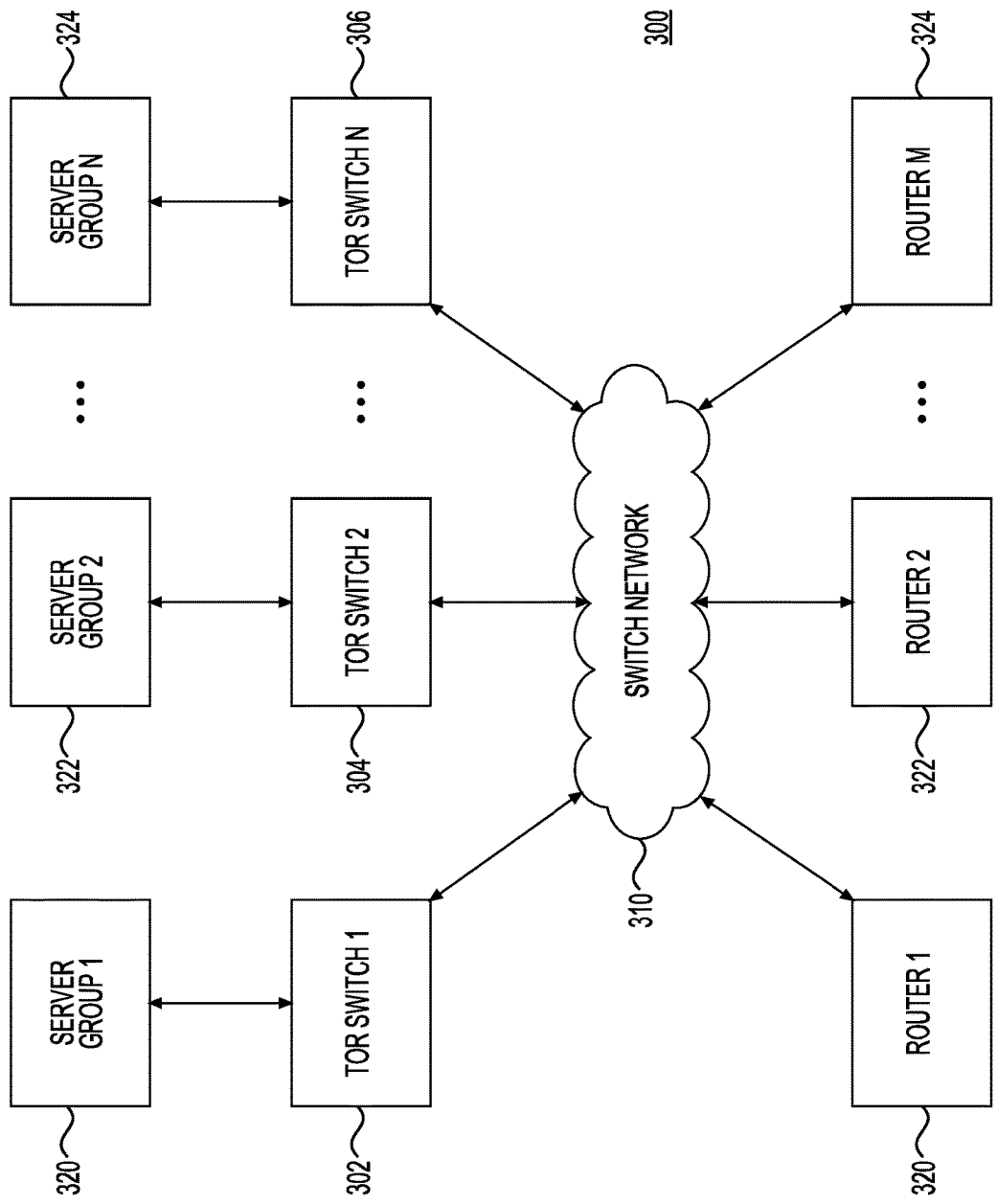
FIG. 3 shows a diagram of a system environment for transmission of messages by acceleration components configured to accelerate a service in accordance with one example.

FIG. 3 shows a diagram of a system environment 300 for transmission or retransmission of messages by acceleration components configured to accelerate a service in accordance with one example. In this example, IP routing may be used for transmitting or receiving messages among TOR switches, including TOR Switch 1 302, TOR Switch 2 304, and TOR Switch N 306. Each server or server group may have a single "physical" IP address that may be provided by the network administrator. Thus, in this example, Server Group 1 320, Server Group 2 322, and Server Group N 324 may each include servers, where each of them may have a "physical" IP address. Acceleration components may use its server's physical IP as its address. To distinguish between IP packets destined for the host from packets destined for an acceleration component, UDP packets, with a specific port to designate the acceleration component as the destination, may be used. An acceleration component may transmit a message to a selected set of acceleration components associated with different TOR switches using Layer 3 functionality corresponding to the seven-layer open-systems interconnection (OSI) model. Layer 3 functionality may be similar to that provided by the network layer of the OSI model. In this example, an acceleration component may transmit a point-to-point message to each of the other relevant acceleration components associated with respective TOR switches. Those acceleration components may then use a Layer 2 Ethernet broadcast packet to send the data to all of the acceleration components associated with the TOR switch. Layer 2 functionality may be similar to that provided by the data-link layer of the OSI model. Layer 2 functionality may include media access control, flow control, and error checking. In one example, this step will not require any broadcasting support from a network interconnecting the acceleration plane and the software plane. This may advantageously alleviate the need for multicasting functionality provided by the routers or other network infrastructure. This, in turn, may reduce the complexity of deploying and managing acceleration components. In addition, in general, the higher levels of the network (e.g., the network including routers and other TOR switches) may be oversubscribed, which, in turn, may lower the bandwidth available to acceleration components communicating using the higher network. In contrast in this example, the acceleration components that share a TOR switch may advantageously have a higher bandwidth available to them for any transmission of messages from one acceleration component to another. Although FIG. 3 shows a certain arrangement of switches and routers, other arrangements may also be used. In addition, the servers may be grouped differently than shown in FIG. 3.

Figure 4:
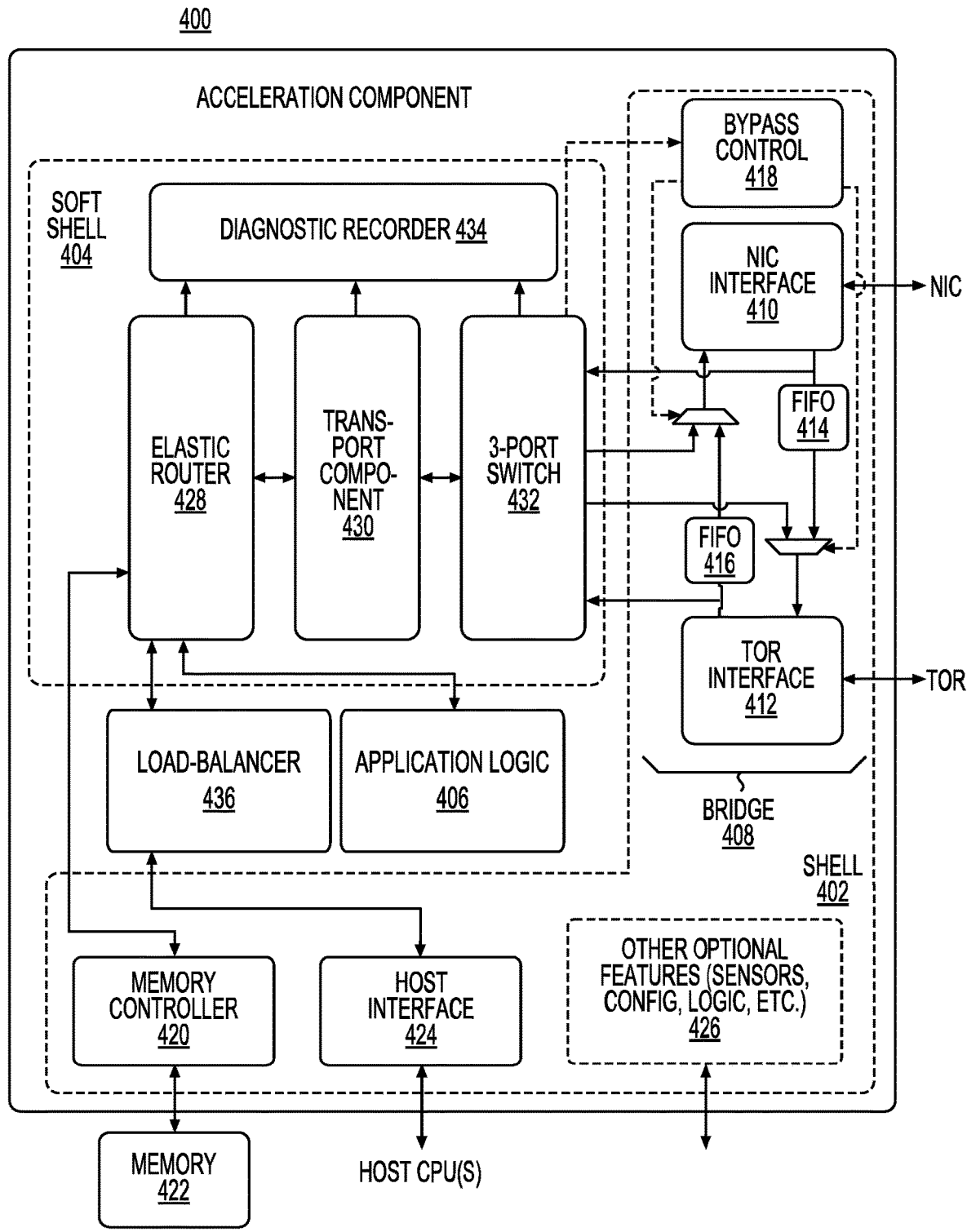
FIG. 4 shows a diagram of an acceleration component in accordance with one example.

FIG. 4 shows a diagram of an acceleration component 400 in accordance with one example. Acceleration component 400 can be included in acceleration plane 106. Components included in acceleration component 400 can be implemented on hardware resources (e.g., logic blocks and programmable interconnects) of acceleration component 400.

Acceleration component 400 may include application logic 406, soft shell 404 associated with a first set of resources and shell 402 associated with a second set of resources. The resources associated with shell 402 may correspond to lower-level interface-related components that may generally remain the same across many different application scenarios. The resources associated with soft shell 404 can remain the same across at least some different application scenarios. The application logic 406 may be further conceptualized as including an application domain (e.g., a "role"). The application domain or role can represent a portion of functionality included in a composed service spread out over a plurality of acceleration components. Roles at each acceleration component in a group of acceleration components may be linked together to create a group that provides the service acceleration for the application domain.

The application domain hosts application logic 406 that performs service specific tasks (such as a portion of functionality for ranking documents, encrypting data, compressing data, facilitating computer vision, facilitating speech translation, machine learning, etc.). Resources associated with soft shell 404 are generally less subject to change compared to the application resources, and the resources associated with shell 402 are less subject to change compared to the resources associated with soft shell 404 (although it is possible to change (reconfigure) any component of acceleration component 400).

In operation, in this example, application logic 406 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to the shell 402, shell resources may include bridge 408 for coupling acceleration component 400 to the network interface controller (via an NIC interface 410) and a local top-of-rack switch (via a TOR interface 412). Bridge 408 also includes a data path that allows traffic from the NIC or TOR to flow into acceleration component 400, and traffic from the acceleration component 400 to flow out to the NIC or TOR. Internally, bridge 408 may be composed of various FIFOs (414, 416) which buffer received packets, and various selectors and arbitration logic which route packets to their desired destinations. A bypass control component 418, when activated, can control bridge 408 so that packets are transmitted between the NIC and TOR without further processing by the acceleration component 400.

Memory controller 420 governs interaction between the acceleration component 400 and local memory 422 (such as DRAM memory). The memory controller 420 may perform error correction as part of its services.

Host interface 424 may provide functionality that enables acceleration component 400 to interact with a local host component (not shown). In one implementation, the host interface 424 may use Peripheral Component Interconnect Express (PCIe), in conjunction with direct memory access (DMA), to exchange information with the local host component. The outer shell may also include various other features 426, such as clock signal generators, status LEDs, error correction functionality, and so on.

Elastic router 428 may be used for routing messages between various internal components of the acceleration component 400, and between the acceleration component and external entities (e.g., via a transport component 430). Each such endpoint may be associated with a respective port. For example, elastic router 428 is coupled to memory controller 420, host interface 424, application logic 406, and transport component 430.

Load-balancer 436 may be coupled to host interface 424 and elastic router 428. Load-balancer 436 may be designed to collect information and to react to state changes depending on its configuration. Although load-balancer 436 is shown as part of acceleration component 400, load-balancer 436 may be part of a different arrangement.

Transport component 430 may formulate packets for transmission to remote entities (such as other acceleration components) and receive packets from the remote entities (such as other acceleration components). In this example, a 3-port switch 432, when activated, takes over the function of routing packets between the NIC and TOR, and between the NIC or TOR and a local port associated with the acceleration component 400.

3-port switch 432 may provide features to prevent packets for acceleration components from being sent on to the host system. If the data network supports several lossless classes of traffic, 3-port switch 432 can be configured to provide sufficient support to buffer and pause incoming lossless flows to allow it to insert its own traffic into the network. To support that, 3-port switch 432 can be configured to distinguish lossless traffic classes (e.g., Remote Direct Memory Access (RDMA)) from lossy (e.g., TCP/IP) classes of flows. A field in a packet header can be used to identify which traffic class the packet belongs to. Configuration memory may be used to store any configuration files or data structures corresponding to 3-port switch 432.

3-port switch 432 may have a host-side port to connect to a first MAC and a network-side to connect to a second MAC. A third local port may provide internal service to a transport component (e.g., transport component 430). 3-port switch 432 may generally operate as a network switch, with some limitations.

Diagnostic recorder 434 may store information regarding operations performed by the router 428, transport component 430, and 3-port switch 432 in a circular buffer. For example, the information may include data about a packet's origin and destination IP addresses, host-specific data, or timestamps. The log may be stored as part of a telemetry system (not shown) such that a technician may study the log to diagnose causes of failure or sub-optimal performance in the acceleration component 400.

A plurality of acceleration components like acceleration component 400 can be included in acceleration plane 106. Acceleration components can use different network topologies (instead of using network 120 for communication) to communicate with one another. In one aspect, acceleration components are connected directly to one another, such as, for example, in a two-dimensional torus. Although FIG. 4 shows a certain number of components of acceleration component 400 arranged in a certain manner, there could be more or fewer number of components arranged differently. In addition, various components of acceleration component 400 may be implemented using other technologies as well.

Figure 5:
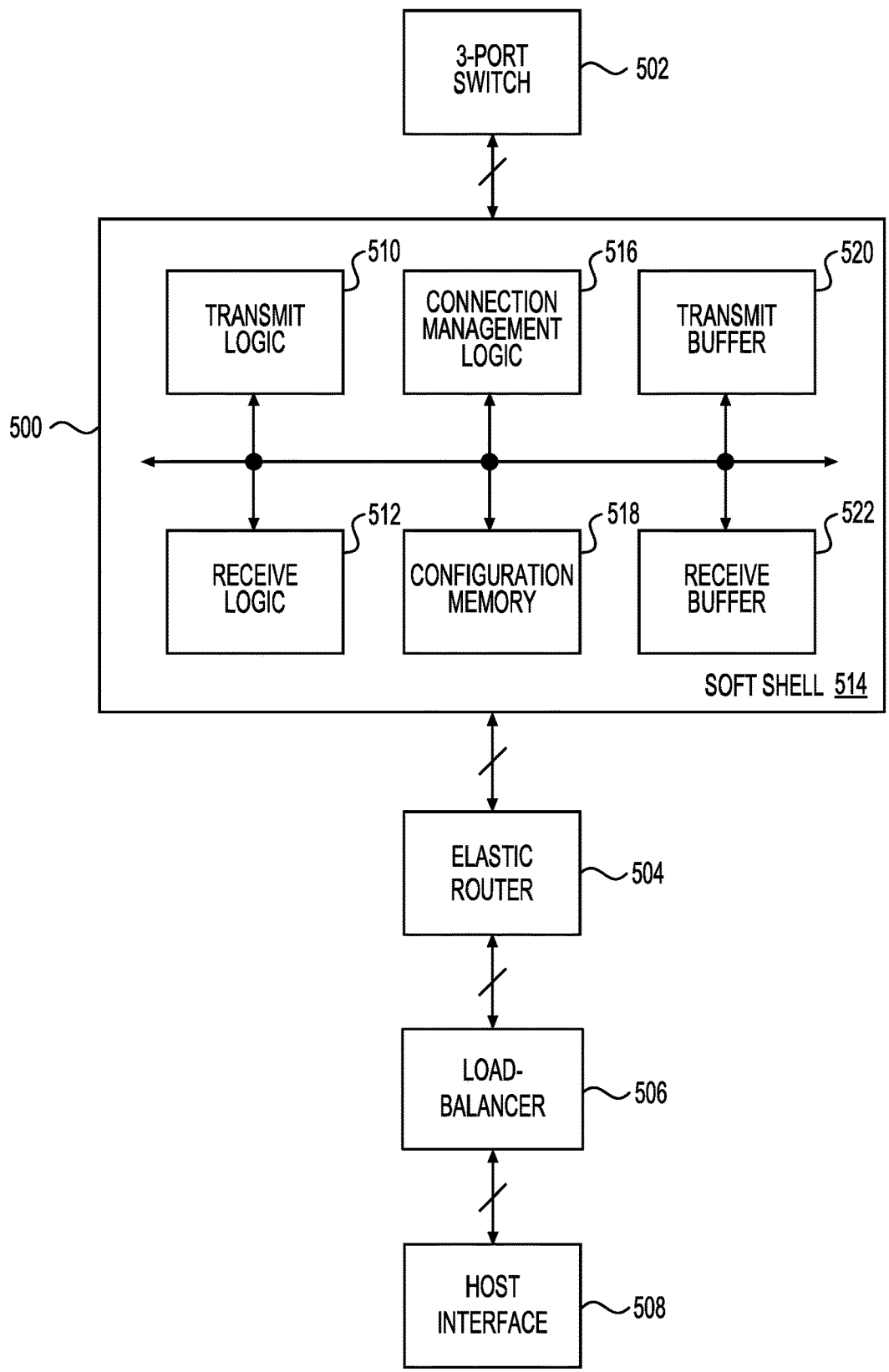
FIG. 5 shows an arrangement of components for transmission of service requests from the host in accordance with one example.

FIG. 5 shows an arrangement of components for transmission of service requests from host interface 508 in accordance with one example. A transport component 500 (an example corresponding to transport component 430 of FIG. 4) coupled to a 3-port switch 502 (an example corresponding to 3-port 432 of FIG. 4) and an elastic router 504 in accordance with one example. Elastic router 504 may be coupled to load-balancer 506, which in turn may be coupled to host interface 508.

In this example, load-balancer 506 is a hardware unit configured to monitor acceleration components in an acceleration group and steer requests related to a service to an appropriate acceleration component. In this example, one of load-balancers main purposes is to direct an incoming request to an acceleration component, which will generate a correct response without violating the quality of service specified by the application logic. Additional details concerning load-balancer 506 are provided with respect to FIG. 6.

In one example, the application logic (e.g., application logic 406 of FIG. 4) corresponding to the service, such as a search results ranking service, may be divided up and mapped into multiple accelerator component's roles. As described earlier, the application logic may be conceptualized as including an application domain (e.g., a "role"). The application domain or role can represent a portion of functionality included in a composed service spread out over a plurality of acceleration components. Roles at each acceleration component in a group of acceleration components may be linked together to create a group that provides the service acceleration for the application domain. Each application domain may host application logic to perform service specific tasks (such as a portion of functionality for ranking documents, encrypting data, compressing data, facilitating computer vision, facilitating speech translation, machine learning, extracting features etc.).

The acceleration components may be grouped together as part of a graph. The grouped acceleration components need not be physically proximate to each other; instead, they could be associated with different parts of the data center and still be grouped together by linking them as part of an acceleration plane. In one example, the graph may have a certain network topology depending upon which of the acceleration components associated with which of the TOR switches are coupled together to accelerate a service. The network topology may be dynamically created based on configuration information received from a service manager for the service. Service manager may be a higher-level software associated with the service. In one example, the network topology may be dynamically adjusted based on at least one performance metric associated with the network (e.g., network 120) interconnecting the acceleration plane and a software plane including host components configured to execute instructions corresponding to the at least one service. Service manager may use a telemetry service to monitor network performance. The network performance metric may be selected substantially, in real time, based at least on the requirements of the at least one service. The at least one network performance metric may comprise latency, bandwidth, or any other performance metric specified by a service manager or application logic corresponding to the at least one service.

Transport component 500 may be configured to act as an autonomous node on a network. In one embodiment, transport component 500 may be configured within an environment or a shell within which arbitrary processes or execution units can be instantiated. The use of transport component 500 may be advantageous because of the proximity between the application logic and the network, and the removal of host-based burdens such as navigating a complex network stack, interrupt handling, and resource sharing. Thus, applications or services using acceleration components with transport components, such as transport component 500, may be able to communicate with lower latencies and higher throughputs. Transport component 500 may itself be an agent that generates and consumes network traffic for its own purposes.

Transport component 500 may be used to implement functionality associated with the mechanism or protocol for exchanging data, including transmitting or retransmitting messages. In this example, transport component 500 may include transmit logic 510, receive logic 512, soft shell 514, connection management logic 516, configuration memory 518, transmit buffer 520, and receive buffer 522. These elements may operate to provide efficient and reliable communication among transport components that may be included as part of the acceleration components.

In one example, transport component 500 may be used to implement the functionality associated with the Lightweight Transport Layer (LTL). Consistent with this example of the LTL, transport component 500 may expose two main interfaces for the LTL: one for communication with 3-port switch 502 (e.g., a local network interface that may then connect to a network switch, such as a TOR switch) and the other for communication with elastic router 504 (e.g., an elastic router interface). In this example, the local network interface (local_*) may contain a NeworkStream, Ready, and Valid for both Rx and Tx directions. In this example, the elastic router interface (router_*) may expose a FIFO-like interface supporting multiple virtual channels and a credit-based flow control scheme. Transport component 500 may be configured via a configuration data structure (struct) for runtime controllable parameters and may output a status data structure (struct for status monitoring by a host or other soft-shell logic). Table 1 below shows an example of the LTL top-level module interface.

TABLE 1 module LTL_Base
(
    input           core_clk,
    input           core_reset,

TABLE 1-continued

| | |
|---|---|
| input LTLConfiguration | cfg, |
| output LTLStatus | status, |
| output NetworkStream | local_tx_out, |
| output logic | local_tx_empty_out, |
| input | local_tx_rden_in, |
| input NetworkStream | local_rx_in, |
| input | local_rx_wren_in, |
| output logic | local_rx_full_out, |
| input RouterInterface | router_in, |
| input | router_valid_in, |
| output RouterInterface | router_out, |
| output | router_valid_out, |
| output RouterCredit | router_credit_out, |
| input | router_credit_ack_in, |
| input RouterCredit | router_credit_in, |
| input | router_credit_ack_out, |
| input LTLRegAccess | register_wrdata_in, |
| input | register_write_in, |
| output logic | LTL_event_valid_out, |
| output LTLEventQueueEntry | LTL_event_data_out |
| ); | |

Table 2 below shows example static parameters that may be set for an LTL instance at compile time. The values for these parameters are merely examples and additional or fewer parameters may be specified.

TABLE 2

| Parameter Name | Configured Value |
|---|---|
| MAX_VIRTUAL_CHANNELS | 8 |
| ER_PHITS_PER_FLIT | 4 |
| MAX_ER_CREDITS | 256 |
| EXTRA_SFQ_ENTRIES | 32 |

Thus, as noted above in Table 2, this will configure MAX_VIRTUAL_CHANNELS+EXTRA_SFQ_ENTRIES MTU sized buffers for the LTL instance. Elastic router credits (ER_CREDITS) may be issued with a guarantee of at least 1 credit for each virtual channel (VC), and a dynamically calculated number of extra credits. Transport component 500 may expose a configuration input port which sets a number of run-time values. This configuration port may be defined as part of the LTLConfiguration struct data structure. The fields for an example data structure are enumerated in the following table (Table 3):

TABLE 3

| Field Name | Example description |
|---|---|
| Src_IP | IPv4 Source Address. |
| Src_MAC | Ethernet MAC address used as the source of all LTL generated messages. |
| Src_port | The UDP source port used in all LTL messages. |
| Dst_port | The UDP destination port for all LTL messages. |
| DSCP | The DSCP value set in IPv4 header of LTL messages - controls which Traffic Class (TC) LTL packets are routed in the datacenter. |
| Throttle_credits_per_scrub | Number of cycles to reduce the per-flow inter_packet gap by on each scrub of the connection table. This may effectively provide a measure of bandwidth to return to each flow per time-period. This may be used as part of congestion management. |
| Throttle_scrub_delay | Cycles to delay starting the next credit scrubbing process. |

TABLE 3-continued

| Field Name | Example description |
|---|---|
| Timeout_Period | Number of time-period counts to wait before timing out an unacknowledged packet and resending it. |
| Disable_timeouts | When set to 1, flows may never "give up"; in other words, unacknowledged packets will be resent continually. |
| Throttle_min | Minimum value of throttling IPG. |
| Throttle_max | Maximum value of throttling IPG. |
| Throttle_credit_multiple | Amount by which throttling IPG is multiplied on Timeouts, NACKs, and congestion events. This multiplier may also be used for decreasing/increasing the per-flow inter-packet gap when exponential backout/comeback is used (see, for example, throttle_linear_backoff and throttle_exponential_comeback). |
| Disable_timeouts | Disable timeout retries. |
| Disable_timeout_drops | Disable timeout drops that happen after 128 timeout retries. |
| Xoff_period | Controls how long of a pause to insert before attempting to send subsequent messages when a remote receiver is receiving XOFF NACKs indicating that it is currently receiving traffic from multiple senders (e.g., has VC locking enabled). |
| Credit_congest_threshold | When delivering traffic to the ER, if a receiver has fewer than credit_congest_threshold_credits, sends a congestion ACK so the sender slows down. |
| throttle_slow_start_ipg | Delays sending of a subsequent message when a remote receiver has indicated that it is receiving traffic from multiple senders (e.g., has VC locking enabled). |
| throttle_linear_backoff | Enables linear comeback (i.e., linear increase of inter-packet gap) instead of multiplicative/exponential. |
| ltl_event_mask_enable | Controls which messages to filter when posting LTL events to the LTL event queue. |
| mid_message_timeout | Controls how long a receiver should wait before draining half-received messages (e.g., when a sender fails mid-message). |

The functionality corresponding to the fields, shown in Table 3, may be combined, or further separated. Certain fields could also be in a memory indexed by an address or a descriptor field in the LTLConfiguration struct data structure. Similarly, a special instruction may provide information related to any one of the fields in Table 3 or it may combine the information from such fields. Other changes could be made to the LTLConfiguration struct data structure and format without departing from the scope of this disclosure.

As part of LTL, in one example, all messages may be encapsulated within IPv4/UDP frames. Table 4 below shows an example packet format for encapsulating messages in such frames. The Group column shows the various groups of fields in the packet structure. The Description column shows the fields corresponding to each group in the packet structure. The Size column shows the size in bits of each field. The Value column provides a value for the field and, as needed, provides example description of the relevant field.

TABLE 4

| Group | Description | Value |
|---|---|---|
| Ethernet Header | destination MAC source MAC | SendConnections[sCTI].DstMac Cfg.src_mac |
| IPv4 | Version | 0x4 |

TABLE 4-continued

| Group | Description | Value |
|---|---|---|
| | IHL | 0x5 |
| | DSCP | Cfg.DSCP |
| | ECN | 0b01 |
| | Total Length | Entire packet length in bytes |
| | Identification | 0x0000 |
| | Flags | 0b000 |
| | Fragment Offset | 0 |
| | TTL | 0xFF |
| | Protocol | 0x11 (UDP) |
| | Header Checksum | IPv4 Checksum |
| | Source IP Address | Cfg.SrcIP |
| | Destination IP Address | SendConnections[sCTI].DstIP |
| UDP Header | Source Port | Cfg.SrcPort |
| | Destination Port | Cfg.DestPort |
| | Length | Length of UDP header and data |
| LTL | Flags | Bit 7: Last |
| | | Bit 6: ACK |
| | | Bit 5: Congestion |
| | | Bit 4: NACK |
| | | Bit 3: Broadcast |
| | | Bit 2: Retransmit |
| | | Bits1-0: 0 (Reserved) |
| | CTI | Stores the connection table index the receiving node should look up. (Receive CTI for non-ACKs, and Send CTI for ACKs). |
| | Sequence Number | The sequence number of this packet |
| | Length (bytes) | Length of the data payload in bytes |

The functionality corresponding to the fields, shown in Table 4, may be combined, or further separated. Certain fields could also be in a memory indexed by an address or a descriptor field in the packet. Similarly, a special instruction may provide information related to any one of the fields in Table 4 or it may combine the information from such fields. Other changes could be made to the packet structure and format without departing from the scope of this disclosure.

Connection management logic 516 may provide a register interface to establish connections between transport components. Connection management logic 516 along with software (e.g., a soft shell) may setup the connections before data can be transmitted or received. In one example, there are two connection tables that may control the state of connections, the Send Connection Table (SCT) and the Receive Connection Table (RCT). Each of these tables may be stored as part of configuration memory 518 or some other memory associated with transport component 500. Each entry in the SCT, a Send Connection Table Entry (SCTE), may store the current sequence number of a packet and other connection state used to build packets, such as the destination MAC address. Requests arriving from elastic router 504 may be matched to an SCTE by comparing the destination IP address and the virtual channel fields provided by elastic router 504. At most one connection may target a destination IP address and a VC pair. Thus, the tuple {IP, VC} may be a unique key (in database terms) in the table. It may be possible to have two entries in the table with the same VC for example, {IP: 10.0.0.1, VC: 0}, and {IP: 10.0.0.2, VC:0}. It may also be possible to have two entries with the same IP address and different VCs: {IP: 10.0.0.1, VC: 0} and {IP: 10.0.0.1, VC: 1}. However, two entries with the same {IP, VC} pair may not be allowed. The number of entries that LTL supports may be configured at compile time.

Elastic router 504 may move data in Flits, which may be 128B in size (32B×4 cycles). Messages may be composed of multiple flits, de-marked by start and last flags. In one example, once elastic router 504 selects a flow to send from an input port to an output port for a given virtual channel, the entire message must be delivered before another message will start to arrive on the same virtual channel. Connection management logic 516 may need to packetize messages from elastic router 504 into the network's maximum transport unit (MTU) sized pieces. This may be done by buffering data on each virtual channel until one of the following conditions is met: (1) the last flag is seen in a flit or (2) an MTU's worth of data (or appropriately reduced size to fit headers and alignment requirements). In this implementation, the MTU for an LTL payload may be 1408 bytes. Once one of the requirements is met, transport component 500, via transmit logic 510, may attempt to send that packet. Packet destinations may be determined through a combination of which virtual channel the message arrives on at transport component 500 input (from elastic router 504) and a message header that may arrive during the first cycle of the messages from elastic router 504. These two values may be used to index into the Send Connection Table, which may provide the destination IP address and sequence numbers for the connection. In this example, each packet transmitted on a given connection should have a sequence number one greater than the previous packet for that connection. The only exception may be for retransmits, which may see a dropped or unacknowledged packet retransmitted with the same sequence number as it was originally sent with. The first packet sent on a connection may have Sequence Number set to 1. So, as an example, for a collection of flits arriving on various virtual channels (VCs) into transport component 500 from elastic router 504, data may be buffered using buffers (e.g., receive buffer 522) until the end of a message or MTU worth of data has been received and then a packet may be output. In this example, the LTL instance may send messages as soon as it has buffered the data—i.e. it will not wait for an ACK of the first message before sending the next. There may be no maximum message size. The LTL instance may just keep chunking up a message into MTU-sized packets and transmit them as soon as an MTU's worth data is ready. Similarly, in this example, there is no "message length" field in the packets anywhere—only a payload size for each packet. Transport component 500 may not have advance knowledge of how much data a message will contain. Preferably, an instance of LTL associated with transport component 500 may deliver arriving flits that match a given SCT entry, in-order, even in the face of drops and timeouts. Flits that match different SCT entries may have no ordering guarantees.

In this example, transport component 500 will output one credit for each virtual channel, and then one credit for each shared buffer. Credits will be returned after each flit, except for when a flit finishes an MTU buffer. This may happen if a last flag is received or when a flit contains the MTUth byte of a message. Credits consumed in this manner may be held by transport component 500 until the packet is acknowledged.

In terms of the reception of the packets by an instance of LTL associated with transport component 500, in one example, packets arriving from the network are matched to an RCT entry (RCTE) through a field in the packet header. Each RCTE stores the last sequence number and which virtual channel (VC) to output packets from transport component 500 to elastic router 504 on. Multiple entries in the RCT can point to the same output virtual channel. The number of entries that LTL supports may be configured at compile time. When packets arrive on the local port from the Network Switch, transport component 500 may determine which entry in the Receive Connection Table (RCT) the packet pairs with. If no matching RCT table exists, the packet may be dropped. Transport component 500 may check that the sequence number matches the expected value from the RCT entry. If the sequence number is greater than the RCT entry, the packet may be dropped. If the sequence number is less than the RCT entry expects, an acknowledgement (ACK) may be generated and the packet may be dropped. If it matches, transport component 500 may grab the virtual channel field of the RCT entry. If the number of available elastic router (ER) credits for that virtual channel is sufficient to cover the packet size, transport component 500 may accept the packet. If there are insufficient credits, transport component 500 may drop the packet. Once the packet is accepted, an acknowledgement (ACK) may be generated and the RCT entry sequence number may be incremented. Elastic router 504 may use the packet header to determine the final endpoint that the message is destined for. Transport component 500 may need sufficient credits to be able to transfer a whole packet's worth of data into elastic router 504 to make forward progress. To help ensure that all VCs can make progress, transport component 500 may require elastic router 504 to provide dedicated credits for each VC to handle at least one MTU of data for each VC. In this example, no shared credits may be assumed.

SCT/RCT entries can be written by software. In one example, software may keep a mirror of the connection setup. To update an SCT or an RCT entry, the user may write to the register_wrdata_in port, which may be hooked to registers in the soft shell or environment corresponding to the application logic. Table 5, below, is an example of the format of a data structure that can be used for updating entries in the SCT or the RCT.

TABLE 5

| typedef struct packed { | |
|---|---|
| EthMac | MacAddr; |
| logic | scte_not_rcte; //1 bit |
| LRPCTI | sCTI; //16 bits |
| LRPCTI | rCTI; //16 bits |
| VC | Virtual Channel; //3 bits |
| IPAddress | IPAddr; //32 bits |
| } LTLRegAccess; | |
| input LTLRegAccess | register_wrdata_in, |
| input | register_write_in |

To write to an SCT entry, one may set scte_not_rcte to 1, set sCTI value to the value of the index for the SCT that is being written to, and then set the other fields of the data structure in Table 5 appropriately. With respect to timing, the value of register_write_in may be toggled high for at least one cycle. rCTI may be set to the remote acceleration component's RCT entry (in this example, rCTI is included in the UDP packets sent to that acceleration component and this is how the correct connection on the other end is looked up). IPAddr may be set to the destination acceleration component's IP address. MacAddr may be set to the MAC address of the host on the same LAN segment as the acceleration component or the MAC address of the router for the remote hosts. VirtualChannel may be set by looking it up from the flit that arrives from elastic router 504. To write to an RCT entry, one may set scte_not_rcte to 0, set rCTI value to the value of the index of the RCT that is being written to, and then set the other fields of the data structure in Table 5 appropriately. rCTI may be set to the sending acceleration component's RCT entry. IPAddr may be set to the sending acceleration component's IP address. MacAddr may be ignored for the purposes of writing to the RCT. VirtualChannel may be set to the channel on which the message will be sent to elastic router 504.

As an example, to establish a one-way link from a node A (e.g., transport component A (10.0.0.1)) to node B (e.g., transport component B (10.0.0.2)), one could: (1) on transport component A create SCTE {sCTI: 1, rCTI: 4, IP: 10.0.0.2, VC: 1, Mac:01-02-03-04-05-06}; and (2) on transport component B create ROTE {rCTI: 4, sCTI: 1, IP: 10.0.0.1, VC: 2}. In this example, this would take messages that arrive from an elastic router on transport component A with DestIP==10.0.0.2 and VC==1 and send them to transport component B in a packet. The packet header will have the rCTI field set to 4 (the rCTI value read from the SCT). Transport component B will access its RCT entry 4, and learn that the message should be output on VC 2. It will also generate an ACK back to transport component A. In this packet, the sCTI field will have the value 1 (populated from the sCTI value read from the RCT).

An instance of LTL associated with transport component 500 may buffer all sent packets until it receives an acknowledgement (ACK) from the receiving acceleration component. If an ACK for a connection doesn't arrive within a configurable timeout period, the packet may be retransmitted. In this example, all unacknowledged packets starting with the oldest will be retransmitted. A drop of a packet belonging to a given SCT may not alter the behavior of any other connections—i.e. packets for other connection may not be retransmitted. Because the LTL instance may require a reliable communication channel and packets can occasionally go missing on the network, in one example, a timeout based retry mechanism may be used. If a packet does not receive an acknowledgement within a certain time-period, it may be retransmitted. The timeout period may be set via a configuration parameter.

Transport component 500 may also provide congestion control. If an LTL instance transmits data to a receiver incapable of absorbing traffic at full line rate, the congestion control functionality may allow it to gracefully reduce the frequency of packets being sent to the destination node. Each LTL connection may have an associated inter-packet gap state that controls the minimum number of cycles between the transmission of packets in a flow. At the creation of a new connection, the IPG may be set to 1, effectively allowing full use of any available bandwidth. If a timeout, ECN notification, or NACK occurs on a flow, the delay may be multiplied by the cfg.throttle_credit_multiple parameter (see Table 2) or increased by the cfg.throttle_credits_per_scrub parameter (see Table 2; depending on if linear or exponential backoff is selected). Each ACK received may reduce the IPG by the cfg.throttle_credits_per_ scrub parameter (see Table 2) or divide it by the cfg.throttle_credit_multiple parameter (see Table 2; depending on if linear or exponential comeback is selected). An LTL instance may not increase a flow's IPG more than once every predetermined time period; for example, not more than every 2 microseconds (in this example, this may be controlled by the cfg.throttle_scrub_delay parameter (see Table 2)).

When an LTL instance associated with transport component 500 successfully receives a packet, it will generate an acknowledgement (for example, a packet with the ACK flag bit set). Acknowledgements (ACKs) may include a sequence number that tells the sender the last packet that was successfully received and the SCTI the sender should credit the ACK to (this value may be stored in the ACK-generator's RCT). Per one example of the LTL, the following rules may be used for generating ACKS: (1) if the RX Sequence Number matches the expected Sequence Number (in RCT), an ACK is generated with the received sequence number; (2) if the RX Sequence Number is less than the expected Sequence Number, the packet is dropped, but an ACK with the highest received Sequence Number is generated (this may cover the case where a packet is sent twice (perhaps due to a timeout) but then received correctly); and (3) if the RX Sequence Number is greater than the expected Sequence Number, the packet is dropped and no ACK is generated. As explained below, in one example, acknowledgements (ACKs) may also be used to provide information updates to the load-balancer.

Figure 6:
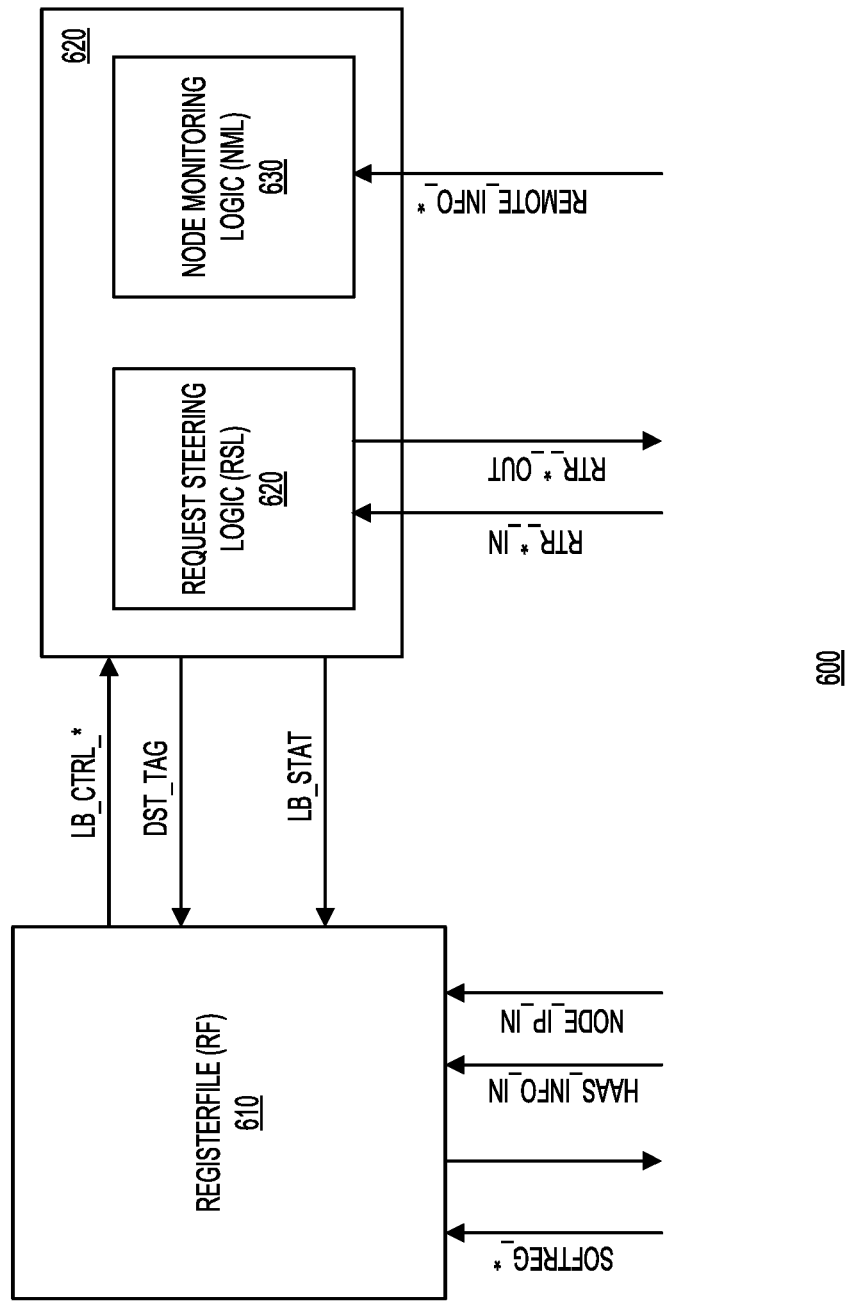
FIG. 6 shows a diagram of a load-balancer in accordance with one example.

FIG. 6 shows a load-balancer 600 in accordance with one example. In this example, load-balancer 600 may maintain a table of acceleration components that it monitors. Periodically, load-balancer 600 may receive information updates from an acceleration component. The information updates may be received as part of the ACKs received from the intended receiver of the packets transmitted by the host (e.g., the host component described earlier). In one example, each update may contain the number of bytes processed by the acceleration component since the last update, the number of cycles taken to process that number of bytes, the number of bytes in a processing queue of the acceleration component, and the acceleration component identifier. Load-balancer 600 may accumulate the total number of updates from each acceleration component, the number of processed bytes by the acceleration component, and the number of cycles taken to process a specified number of bytes. In this example, load-balancer 600 may calculate a processing rate associated with each acceleration component that it monitors. In addition, load-balancer 600 may keep track of the Hardware as a Service (HaaS) input buffer occupancy thresholds for each acceleration component. The use of the term HaaS in this disclosure does not mean that the present disclosure is limited for use in a hardware as a service model. Instead, this term is simply used to refer to the input buffer associated with the acceleration component that is receiving input requests from a service. By doing so, load-balancer 600 may keep track of the acceleration components in terms of their health, and load-balancer 600 may steer requests to the acceleration components that are healthy.

With continued reference to FIG. 6, load-balancer 600 may include a register file (RF) 610, a request steering logic (RSL) 620, and a node monitoring logic (NML) 630. In this example, RF 610 may be a module that includes configuration and statistics registers and can be read/written through the SOFTREG_* interface. RSL 620 may include logic configured to steer a packet to an acceleration component based on the status of the acceleration components in the available group of acceleration components. NML 630 may process information updates from the acceleration components and keep track of their status. Table 6 below shows an example set of configuration and statistics registers included in the example RF 610. The first column corresponds to the address of the register. The address for each register may be specified as an offset from the base register in RF 610. The second column corresponds to the name of the register (Name); the third column corresponds to the access parameters (read, write, or read/write)(Access); the fourth column corresponds to the default values (Default Value); and the fifth column provides a description (Description).

TABLE 6

| Addr | Name | Access | Default Value | Description |
|---|---|---|---|---|
| 0x0 | CTRL_REG | R/W | 0x0 | LOAD-BALANCER control register bit 0- LOAD-BALANCER enabled bit 1- always use steering logic for determining a processing node for a request |
| 0x1 | DSTENBLMSK_REG | R/W | 0x00 | Enable mask for acceleration component. Bit 0 corresponds to an acceleration component with LOAD-BALANCER IDENTIFIER (LBID) 0, bit 1 corresponds to an acceleration component with LBID 1, etc. 0 value for a bit indicates that the acceleration component is not enabled. |
| 0x2 | HTHRESHVAL_REG | R/W | 0x00 | High HaaS occupancy threshold value in words (1 word = 4 bytes) |
| 0x3 | LTHRESHVAL_REG | R/W | 0x00 | Low HaaS occupancy threshold value in words (1 word = 4 bytes) |
| 0x4 | HTHRESHACT_REG | R/W | 0x00 | High HaaS occupancy threshold action bit 0- fixed penalty equal to high occupancy threshold operand bit 1- penalty equal to HaaS occupancy in bytes bit 2- penalty equal to 2 times HaaS occupancy in bytes bit 3- penalty equal to 16 times HaaS occupancy in bytes bit 4- penalty equal to 64 times HaaS occupancy in bytes bit 5- penalty equal to HaaS occupancy in bytes scaled by the acceleration component's processing rate |
| 0x5 | LTHRESHACT_REG | R/W | 0x0 | Low HaaS occupancy threshold action bit 0- fixed penalty equal to low occupancy threshold operand |
| 0x6 | HTHRESHOP_REG | R/W | 0x0 | High HaaS occupancy threshold operand |
| 0x7 | LTHRESHOP_REG | R/W | 0x0 | Low HaaS occupancy threshold operand |
| 0x8 | HEALTH_REG | R | undefined | Current health status of acceleration components |
| 0x9 | LCLINFOCNT_REG | R/W | 0x0 | Value of a local acceleration component's info counter when its status is sent to NML |
| 0xa | RESERVED | | | |
| 0xb | WNDSIZE_REG | R/W | 0x0 | Window size in number of info updates from each acceleration component for averaging its process rate |
| 0xc | DSTTBLSIZE_REG | R/W | 0x0 | Size of an acceleration component's address table |
| 0xd | LCLNODEINFO_REG | R/W | 0x0 | Information about local acceleration component bit 0-local acceleration |

TABLE 6-continued

| Addr | Name | Access | Default Value | Description |
|---|---|---|---|---|
| | | | | component's address is in the address table bits 8-1- LBID of a local acceleration component |
| 0xe | DSTNOANYAVAIL_REG | R | 0x0 | Number of requests for which RSL did not have any available destination |
| 0xf | DSTNOTINTBL_REG | R | 0x0 | Number of requests which had a LBID not monitored by a LOAD-BALANCER |
| 0x10 | DSTINFOCTRL_REG | R/W | 0x0 | Type of info updates recorded by a statistic counter 0x0-count all info updates 0x1-count only info updates which have HaaS occupancy greater or equal to high occupancy threshold 0x2-count only info updates which have HaaS occupancy less or equal to low occupancy threshold |
| 0x11 | RCRDCTRL_REG | R/W | 0x1 | Control register for LOAD-BALANCER Recorder bit 0- recorder enable. 0-Disabled. 1-Enabled. bits x-0- recorder memory address. x- depends on a configured recorder depth |
| 0x12 | RCRDDATA_REG | R | undefined | Data register for LOAD-BALANCER Recorder |
| 0x13 | INFOWRONGID_REG | R | 0x0 | A counter for number of info updates which had LBID greater than the address table size |
| 0x20-0x27 | DSTTBLADDR0_REG-DSTTBLADDR7_REG | R/W | 0x0 | Acceleration components' addresses. Register 0x20 corresponds to an acceleration component with a LBID 0, register 0x21 corresponds to an acceleration component with a LBID 1, etc. |
| 0x28-0x30 | STATOVERWR0_REG-STATOVERwr7_REG | R | 0x0 | Counter for number of requests with not overwritten and overwritten with respect to the software processing nodes. Bits 31-0- number of requests with not overwritten destination Bits 63-32- number of requests with overwritten destination |
| 0x30-0x38 | INFOCNT7_REG | R | 0x0 | Number of info updates from each acceleration component. Register 0x30 corresponds to an acceleration component with LBID 0, register 0x31 corresponds to an acceleration component with a LBID 1, etc. |
| 0x38-0x40 | REQCNT0_REG-REQCNT7_REG | R | 0x0 | Number of requests sent to every acceleration component after performing |

TABLE 6-continued

| Addr | Name | Access | Default Value | Description |
|------|------|--------|---------------|-------------|
| | | | | load-balancing. Register 0x38 corresponds to an acceleration component with an LBID 0, register 0x39 corresponds to an acceleration component with an LBID 1, etc. |

Referring still to FIG. 6, RF 610 may control RSL 620 and NML 630 through the LB_CTRL_* interface. RF 610 may receive the information from RSL 620 and NML 630 via the LB-STAT interface. RF 610 may also keep a table with the addresses of the acceleration components such that each packet monitored by load-balancer 600 is tracked. The LBID of a current request may be sent to RF 610 via the DST_TAG interface, and the corresponding address of the acceleration component may be read from the table that has the addresses of the acceleration components. The addresses of the acceleration component may be sent to RSL 620 via the LB_CTRL_* interface.

With continued reference to FIG. 6, NML 630 may keep track of the status of acceleration components associated with the service. NML 630 may receive the information from the acceleration components via the REMOTE_INFO_* interface. The status may be updated as the information updates are received from the acceleration components. An acceleration component may be a local component or a remote acceleration component. Each information update contains the next information about an acceleration component. Table 7 below shows the example information that is part of the information updates:

TABLE 7

| Information Update from an Acceleration Component | |
|---|---|
| INFO_RDTIME | Number of cycles divided by 256 passed since the last information update at an acceleration component |
| INFO_RDWORD | Number of words read from HaaS input buffer since the last information update at an acceleration component |
| INFO_FIFOWORD | Current HaaS input buffer occupancy at an acceleration component |
| INFO_NODEID | LBID of an acceleration component; NML keeps the next state for every processing node (e.g. an acceleration component) configured through LB_DST_TABLE |

NML 630 may keep the next state for each acceleration component using the LB_DST_TABLE (an example is shown in Table 8 below).

TABLE 8

| LB_DST_TABLE | |
|---|---|
| NODE_HEALTH | A single bit indicating if an acceleration component is in a healthy state |
| NODE_RDBYTES | Accumulated number of bytes read from HaaS input buffer at an acceleration component |
| NODE_RDCYCLES | Accumulated number of cycles required to read the above number of bytes |
| NODE_RDRATE | Processing rate of an acceleration component |
| NODE_WINCNT | Number of received information updates from an acceleration component |

In addition to the states described above in Table 8, NML 630 keeps track of the NODE_ENABLETIME value per acceleration component. In this example, this value indicates the time (tracked via a counter) at which the acceleration component will be available. In this example, the NODE_ENABLETIME value is read every cycle for every acceleration component using a round robin scheme. The read value is compared to a free running counter (FREE-RUNNING-COUNTER) which, in this example, is incremented every cycle. In those cases where the read NODE_ENABLETIME value is less than or equal to the value of the free running counter (FREE-RUNNING-COUNTER), the NODE_HEALTH value is set to a healthy state; in the opposite cases, the NODE_HEALTH value is set to an unhealthy state. Alternatively, NML 630 may relabel the node when, as an example, the input buffer occupancy falls below the low threshold (e.g., tracked by comparing the buffer occupancy in bytes (e.g., received via an info update containing INFO_FIFOWORD)) with the specified threshold (e.g., the threshold indicated in the LTHRESHOP_REG register of Table 6) for the node. The unhealthy state may result from some aspect of the acceleration component being negatively affected. As an example, an FPGA may have hit an error state, or the FPGA may have been rebooted, or its power may have been throttled. While software associated with the service may discover the problem with the FPGA, the problem discovery may take a few minutes. In contrast, the hardware implemented load-balancer may obtain the status concerning the health of the FPGA in a much shorter time; as an example, the time it takes for a packet to be acknowledged (ACK or NACK) by the FPGA. Moreover, advantageously, NML 630 need not sense these conditions and instead may simply rely upon tracking of certain values (e.g., the NODE_HEALTH) value to determine a state of the acceleration component. Finally, the software associated with the service may be sending the requests corresponding to the service to different types of acceleration components (e.g., acceleration components with different FPGAs or different versions of FPGAs). Some of these acceleration components may be slower than the other ones. Because the software associated with the service may not be aware of these differences, it may continue sending requests to the slower acceleration components causing performance issues. However, faster feedback through the load-balancer may help alleviate these performance issues.

At reset, all NODE_ENABLETIME values and FREE-RUNNING-COUNTER values may be set to zero, which may set all acceleration components to be in the healthy state. Since the NODE_ENABLETIME value is read in a round robin fashion (or some other fairness-based scheme), the acceleration component can be enabled at a time greater than it was set to. However, in this example, since the maximum number of acceleration components is 8, this difference is insignificant.

In this example, the NODE_ENABLETIME value is updated for every incoming information update. It is set to the current FREE-RUNNING-COUNTER value when the disable period for an acceleration component based on the values in an information update expires. When the value of the number of received information updates from an acceleration component (e.g., as indicated by NODE_WINCNT of Table 8) reaches the window size in terms of the number of the info updates from each of the acceleration components for averaging its processing rate (e.g., tracked in the register named WNDSIZE_REG), the processing rate of the acceleration component (e.g., NODE_RDRATE of Table 8) is updated based on the calculation described below. In addition, each of the values in Table 7 corresponding to NODE_WINCNT, NODE_RDBYTES, NODE_RD-CYCLES is zeroed. In one example, the processing rate of an acceleration component is represented by an 8-bit NODE_RDRATE vector, where every bit corresponds to the next rate, as shown in Table 9 below. Although Table 9 shows a certain correspondence between the bit values and the processing rates, other mappings can also be used to specify processing rates.

TABLE 9

| Bit 0 | $NODE\_RDBYTES \leq \dfrac{NODE\_RDCYCLES}{8}$ |
|---|---|
| Bit 1 | $\dfrac{NODE\_RDCYCLES}{8} < NODE\_RDBYTES \leq \dfrac{NODE\_RDCYCLES}{4}$ |
| Bit 2 | $\dfrac{NODE\_RDCYCLES}{4} < NODE\_RDBYTES \leq \dfrac{NODE\_RDCYCLES}{2}$ |
| Bit 3 | $\dfrac{NODE\_RDCYCLES}{2} < NODE\_RDBYTES \leq NODE\_RDCYCLES$ |
| Bit 4 | NODE_RDCYCLES < NODE_RDBYTES ≤ NODE_RDCYCLES × 2 |
| Bit 5 | NODE_RDCYCLES × 2 < NODE_RDBYTES ≤ NODERDCYCLES × 4 |
| Bit 6 | NODE_RDCYCLES × 4 < NODE_RDBYTES ≤ NODE_RDCYCLES × 8 |
| Bit 7 | NODE_RDBYTES > NODE_RDCYCLES × 8 |

In this example, each information update from an acceleration component contains information about the HaaS ingress buffer occupancy of the acceleration component—INFO_FIFOWORD. When its value is greater or equal to the value specified by the HTHRESHVAL_REG register, the acceleration component is assigned a penalty weight which effectively makes its state to become unhealthy. In one example, the penalty is calculated based on the mode specified in the HTHRESHACT_REG register and the value specified in the HTHRESHOP_REG register.

In one example, the penalty is calculated using the following equation:

PENALTY=OCCUPANCY_WEIGHT+
HTHRESHOP_REG.

OCCUPANCY_WEIGHT is calculated based on the bit value specified by the HTHRESHACT_REG register described earlier with respect to Table 6. Table 10 below shows one example of the bit values specified by the HTHRESHACT_REG register and the calculation of the PENALTY value.

TABLE 10

| HTHRESHACT_REG value | PENALTY value |
|---|---|
| Bit 0 | Fixed penalty equal to the high occupancy threshold operand (e.g., specified by the HTHRESHOP_REG register) |
| Bit 1 | Penalty equal to the HaaS node occupancy in bytes + the fixed penalty |
| Bit 2 | Penalty equal to two-times the HaaS node occupancy in bytes + the fixed penalty |
| Bit 3 | Penalty equal to sixteen-times the HaaS node occupancy in bytes + the fixed penalty |
| Bit 4 | Penalty equal to sixty-four-times the HaaS node occupancy in bytes + the fixed penalty |
| Bit 5 | Penalty equal to the HaaS node occupancy in bytes scaled by a processing rate + the fixed penalty |

Although Table 10 shows a certain correspondence between bit values in the left column and the penalty values, the parameters in this table can be changed using an extra soft register. When the HTHRESHACT_REG register is set to the scaling mode (bit 5), OCCUPANCY_WEIGHT is calculated by multiplying the acceleration component's HaaS input buffer occupancy by a scaling factor. The scaling factor is set, as shown in Table 11 below, based on the processing rate as shown in Table 9 above.

TABLE 11

| Set bit of NODE_RDRATE | 7 | 6 | 5 | 4 | 3 | 2 | 1 | 0 |
|---|---|---|---|---|---|---|---|---|
| scaling_factor value | 512 | 64 | 16 | 2 | 2 | 16 | 64 | 512 |

The scaling factor values can also be changed depending on a type of the workload or the application running on the platform. Thus, these scaling factors are merely examples and they can be configured in other ways.

In this example, the requests coming from a host contain a load-balancer identifier (LBID). RSL 620 may use the LBID to retrieve the health status (e.g., NODE_HEALTH) of a corresponding acceleration component. In this example, all requests from a host may be received by load-balancer 600 via the RTR_*_IN interface and sent to the elastic router (e.g., ER 504 of FIG. 5) via the RTR_*_OUT interface. ER 504 may route the request to a specific processing node (e.g., another acceleration component) based on an address (e.g., an IP address) specified in the request. In this manner, load-balancer 600 may perform request steering by specifying an IP address of the acceleration component to which the elastic router should route the request to. The specified IP address may be the original IP address provided by the host or a different one chosen by RSL 620. Table 12 below shows example interface used by load-balancer 600 for steering requests from the hosts.

TABLE 12

| Name | Width | Description |
|---|---|---|
| RTR_VALID_IN | 1 | Signal is asserted in the presence of a valid phit on the interface |
| RTR_IF_IN.DATA | 256 | Data phit |
| RTR_IF_IN.FIRST | 1 | When signal is asserted it indicates the first phit of a logical message |
| RTR_IF_IN.DST_IP | 32 | Destination IP of a message |

In this example, the term phit may mean a unit of data transferred via the interface to load-balancer 600 in one clock cycle. In other words, the term phit may refer to the physical width of the interface. The term Flit, as noted earlier, may refer to multiple units of phits. In this example, load-balancer 600 may assume that the first data phit of a message contains a network header starting from the least significant bit of the phit. Table 13, shown below, provides an example of the header structure.

TABLE 13

| Network Header Field | Bits | Description |
| --- | --- | --- |
| VER | 127:120 | Version |
| LBID | 119:112 | Load-balancer ID |
| RESERVED1 | 111:96 | Reserved field |
| VC | 95:80 | Virtual channel |
| SLOT | 79:64 | PCIe slot |
| DST_EP | 63:75 | Destination endpoint |
| RESERVED0 | 47:32 | Reserved field |
| DST_IP | 31:0 | Destination IP |

In this example, when load-balancer 600 receives the first phit (e.g., indicated by RTR_IF_IN.FIRST) that is valid (e.g., indicated by RTF_VALID_IN_) of a message (e.g., RTR_IF_IN.DATA), load-balancer 600 may extract an LBID from the network header (e.g., a network header with the structure shown in Table 13). Based on the state provided by NML 630 for the processing node having the extracted LBID, load-balancer 600 either uses the same LBID, RTR_IF_IN.DST_IP, and DST_IP in the network header for the output router interface (RTR_IF_OUT), or it changes the values for these fields based on the information from RSL 620. In the case when load-balancer 600 changes the values of these fields, the processing request is sent to a different acceleration component (e.g., an FPGA node) and not to the original destination specified by the requesting host.

When the specified acceleration component is in an unhealthy state and there are other available acceleration components, RSL 620 effectively forwards the request to the next acceleration component pointed to by the global round robin scheme or another scheme. When no other acceleration components are available, then, in this example, the request is sent to its original destination. Moreover, in one example, sending a request to the original acceleration component can change the status of the original acceleration component to a healthy state.

Figure 7:
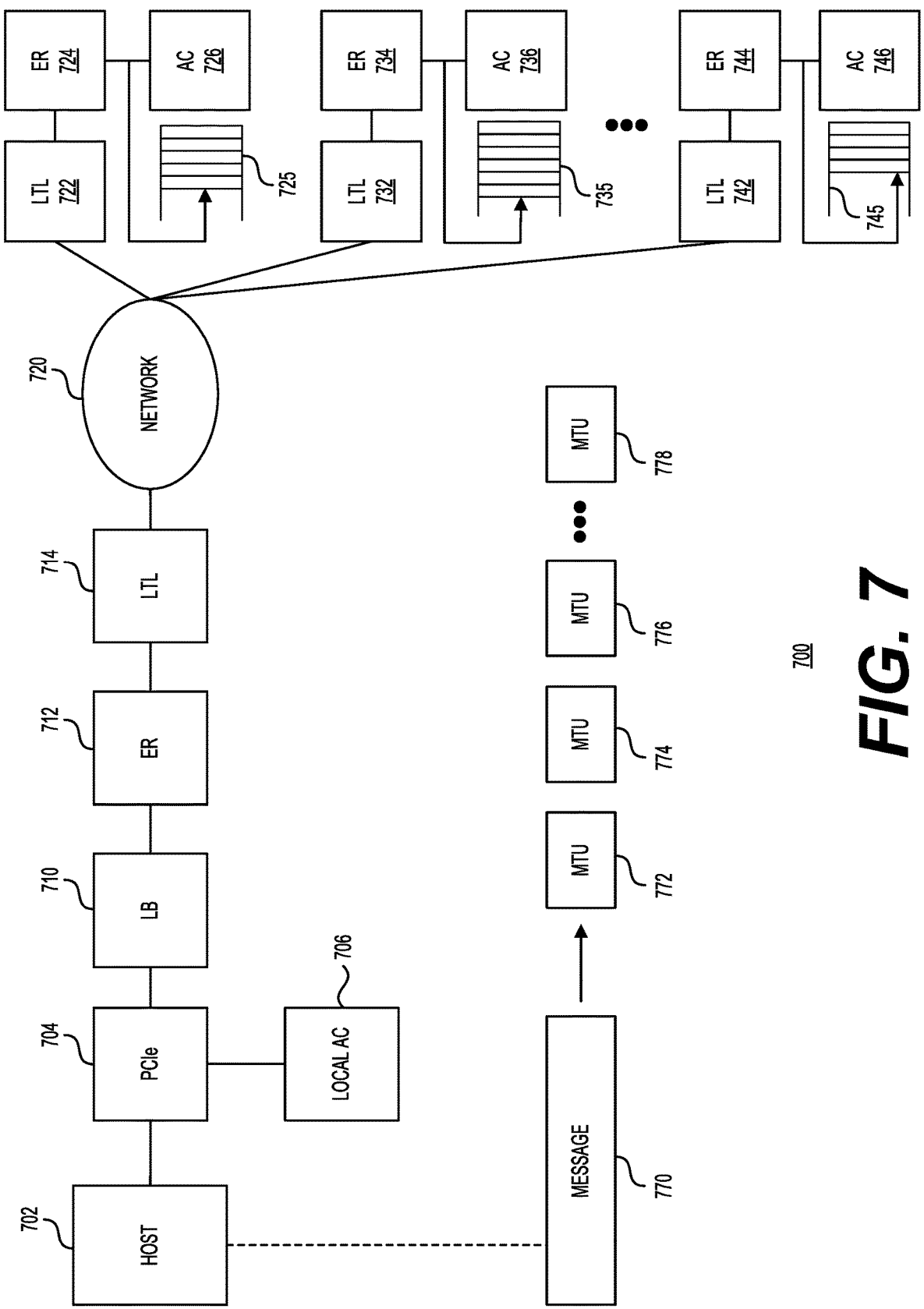
FIG. 7 shows a system including load balancing in accordance with one example.

FIG. 7 shows a system 700 including load balancing in accordance with one example. System 700 may include a host 702 coupled via a high-speed link (e.g., PCIe 704) to a local acceleration component (AC) 706 and to a load-balancer (LB) 710. LB 710 may be coupled to an elastic router (ER) 712. ER 712 may be coupled to a light-weight transport layer (LTL) 714, which may be coupled to network 720. Network 720 may allow host 702 to send request messages corresponding to a service to not only local AC 706, but also to remote acceleration components. Thus, network 720 may be coupled to LTL 722, which may be coupled to ER 724. ER 724 may further be coupled to an acceleration component (AC) 726. Network 720 may further be coupled to LTL 732, which may be coupled to ER 734. ER 734 may further be coupled to an acceleration component (AC) 736. Network 720 may further be coupled to LTL 742, which may be coupled to ER 744. ER 744 may further be coupled to an acceleration component (AC) 746. In this example, host 702 may send a message 770 corresponding to a service (e.g., a ranking service) to any of AC 706, AC 726, AC 736, and AC 746. Message 770 may be split into packets that may have a size determined by the maximum transmission unit (MTU) of network 720. Thus, in this example, message 770 may be split into MTU 772, MTU 774, MTU 776, and MTU 778 during transmission through network 720. Each LTL block may add metadata concerning load-balancing to each of the MTUs. Each acceleration component may include an input buffer for storing packets received from host 702. Thus, in this example, AC 726 may receive packets via input buffer 725; AC 736 may receive packets via input buffer 735; and AC 746 may receive packets via buffer 745. Although FIG. 7 shows a certain number of components arranged in a certain manner, system 700 may include additional or fewer components that are arranged differently.

With continued reference to FIG. 7, as explained earlier, LB 710 may include node monitoring logic (e.g., NML 630) and request steering logic (e.g., RSL 620). NML 630 may use a register file (e.g., RF 610) to keep track of the input buffer occupancy of any of the acceleration components that the host may send messages to. As an example, NML 630 may keep track of the LBID associated with each of the destination acceleration components. NML 630 may thus have a proxy (e.g., the input buffer occupancy metric) for the load being experienced by the destination acceleration components. Each ACK or NACK from the acceleration components may convey information to NML 630. As described earlier, this information may relate to the total number of bytes processed by the acceleration component and the time it took to process those bytes. This way NML 630 may determine a processing rate of the requests.

Figure 8:
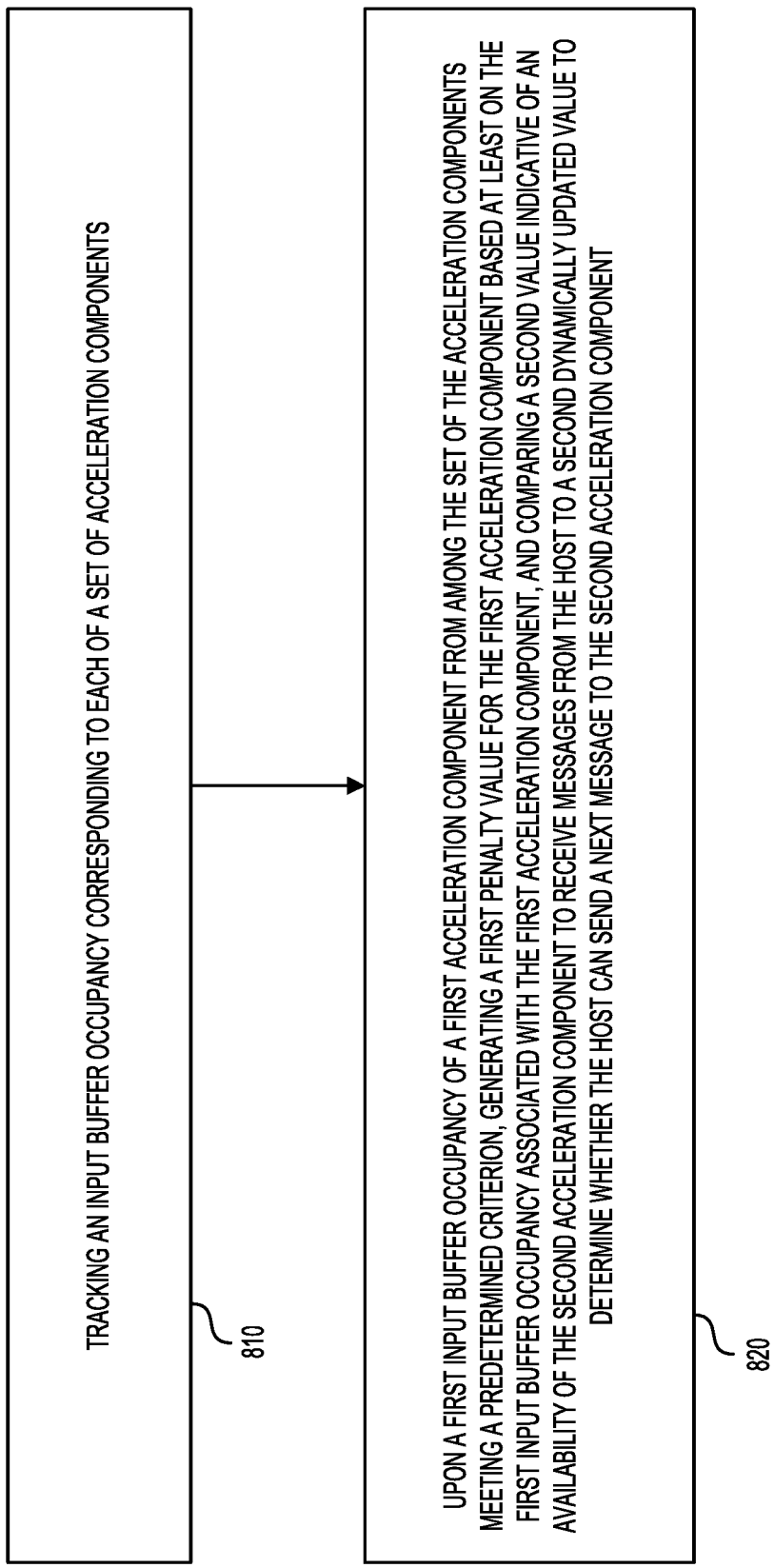
FIG. 8 shows a flow chart of a method for load balancing in accordance with one example.

FIG. 8 shows a flow chart 800 for a method for load balancing in a system including a host configured to send messages, corresponding to a service, to any of a set of acceleration components, in accordance with one example. Step 810 may include tracking an input buffer occupancy corresponding to each of the set of acceleration components. In one example, load-balancer 600 may perform this step. Thus, in this example, NML 630 may track the input buffer occupancy on the host side as explained earlier with respect to Table 6 and related description.

Step 820 may include, upon a first input buffer occupancy of a first acceleration component from among the set of the acceleration components meeting a predetermined criterion, generating a first penalty value for the first acceleration component based at least on the first input buffer occupancy associated with the first acceleration component, and comparing a second value indicative of an availability of the second acceleration component to receive messages from the host to a second dynamically updated value to determine whether the host can send a next message to the second acceleration component. As part of this step, NML 630 may determine when the predetermined criterion is met. The predetermined criterion may include a determination of when a value of INFO_FIFOWORD (e.g., received by NML 630 as part of the information updates from the acceleration components) is greater or equal to the value specified by the HTHRESHVAL_REG register. NML 630 may generate the penalty value by calculating the penalty value based on the mode specified in the HTHRESHACT_REG register and the value specified in the HTHRESHOP_REG register. As an example, NML 630 may generate the penalty value using the following equation: PENALTY=OCCUPANCY_WEIGHT+HTHRESHOP_REG. Table 10, described earlier, provides the various modes for the penalty value. NML 630 may compare a value, such as the NODE_ENABLETIME value, to a free running counter. In this example, the NODE_ENABLE-TIME value is read every cycle for every acceleration component using a round robin scheme. The read value is compared to a free running counter (FREE-RUNNING-COUNTER) which, in this example, is incremented every cycle. Once the acceleration component is determined to be in a position to receive the requests, then NML 630 may communicate that to RSL 620. In addition, if needed, RSL 620 may also use the LBID to retrieve the health status (e.g., NODE_HEALTH) of a corresponding acceleration component. RSL 620 may forward the request to the next acceleration component pointed to by the global round robin scheme or another scheme. Although FIG. 8 shows a certain number of steps listed in a certain order, there could be fewer or more steps and such steps could be performed in a different order.

Figure 9:
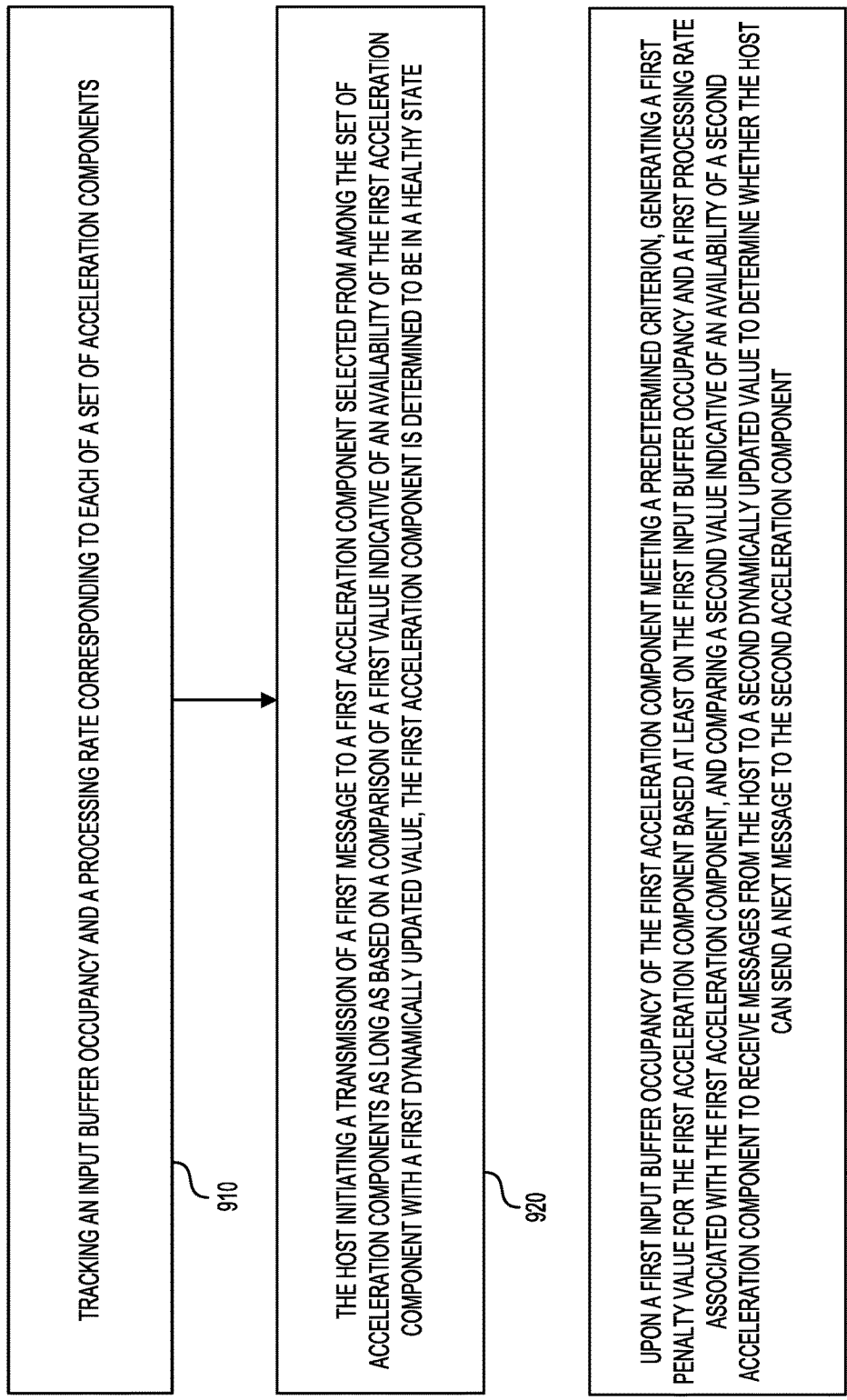
FIG. 9 shows a flow chart of another method for load balancing in accordance with one example.

FIG. 9 shows a flow chart 900 for load balancing in a system including a host configured to send messages, corresponding to a service, to any of a set of acceleration components, in accordance with one example. Step 910 may include tracking an input buffer occupancy and a processing rate corresponding to each of the set of acceleration components. In one example, load-balancer 600 may perform this step. Thus, in this example, NML 630 may track the input buffer occupancy on the host side as explained earlier with respect to Table 6 and related description.

Step 920 may include the host initiating a transmission of a first message to a first acceleration component selected from among the set of acceleration components as long as, based on a comparison of a first value indicative of an availability of the first acceleration component with a first dynamically updated value, the first acceleration component is determined to be in a healthy state. NML 630 may compare a value, such as the NODE_ENABLETIME value, to a free running counter. In this example, the NODE_ENABLETIME value is read every cycle for every acceleration component using a round robin scheme. The read value is compared to a free running counter (FREE-RUNNING-COUNTER) which, in this example, is incremented every cycle. Once the acceleration component is determined to be in a position to receive the requests, then NML 630 may communicate that to RSL 620, which may send the request to the acceleration component.

Step 930 may include, upon a first input buffer occupancy of the first acceleration component meeting a predetermined criterion, generating a first penalty value for the first acceleration component based at least on the first input buffer occupancy and a first processing rate associated with the first acceleration component, and comparing a second value indicative of an availability of a second acceleration component to receive messages from the host to a second dynamically updated value to determine whether the host can send a next message to the second acceleration component. NML 630 may determine when the predetermined criterion is met. The predetermined criterion may include a determination of when a value of INFO_FIFOWORD (e.g., received by NML 630 as part of the information updates from the acceleration components) is greater or equal to the value specified by the HTHRESHVAL_REG register. NML 630 may generate the penalty value by calculating the penalty value based on the mode specified in the HTHRESHACT_REG register and the value specified in the HTHRESHOP_REG register. As an example, the NML 630 may generate the penalty value using the following equation: PENALTY=OCCUPANCY_WEIGHT+ HTHRESHOP_REG. Table 10, described earlier, provides the various modes for the penalty value. NML 630 may compare a value, such as the NODE_ENABLETIME value to a free running counter. In this example, the NODE_ENABLETIME value is read every cycle for every acceleration component using a round robin scheme. The read value is compared to a free running counter (FREE-RUNNING-COUNTER) which, in this example, is incremented every cycle. Once the acceleration component is determined to be in a position to receive the requests, then NML 630 may communicate that to RSL 620. In addition, if needed, RSL 620 may also use the LBID to retrieve the health status (e.g., NODE_HEALTH) of a corresponding acceleration component. RSL 620 may forward the request to the next acceleration component pointed to by the global round robin scheme or another scheme. Although FIG. 9 shows a certain number of steps listed in a certain order, there could be fewer or more steps and such steps could be performed in a different order.

In conclusion, the present disclosure relates to a method in a system comprising a host configured to send messages, corresponding to a service, to any of a set of acceleration components. The method may include tracking an input buffer occupancy corresponding to each of the set of acceleration components. The method may further include, upon a first input buffer occupancy of a first acceleration component from among the set of the acceleration components meeting a predetermined criterion, generating a first penalty value for the first acceleration component based at least on the first input buffer occupancy associated with the first acceleration component, and comparing a second value indicative of an availability of the second acceleration component to receive messages from the host to a second dynamically updated value to determine whether the host can send a next message to the second acceleration component.

The method may further include, if the second value indicative of the availability of the second acceleration component is greater than the second dynamically updated value, then steering the next message from the host to the second acceleration component. The method may further include, if the second value indicative of the availability of the second acceleration component is less than or equal to the second dynamically updated value, steering the next message from the host to a third acceleration component selected from among the set of acceleration components as long as, based on a comparison of a third value indicative of an availability of the third acceleration component with a third dynamically updated value, the third acceleration component is determined to be in a healthy state.

The first dynamically updated value may comprise a first value of a first free running counter managed by a load-balancer, and the second dynamically updated value may comprise a second value of a second free running counter managed by the load-balancer. The method may further include periodically decrementing the first penalty value by a specified value.

The first penalty value may comprise a fixed penalty value equal to a high occupancy threshold associated with the first input buffer occupancy. The first penalty value may comprise a sum of a fixed penalty value and the first input buffer occupancy in bytes. The first penalty value may comprise one of: a sum of a fixed penalty and the first input buffer occupancy multiplied by two, the sum of the fixed penalty and the first input buffer occupancy multiplied by sixteen, the sum of the fixed penalty and the first input buffer occupancy multiplied by sixty-four.

In another example, the present disclosure relates to a system comprising a set of acceleration components and a host, configured to send messages, corresponding to a service, to any of a set of acceleration components. The system may further include a load-balancer configured to: (1) track an input buffer occupancy corresponding to each of the set of acceleration components, and (2) upon a first input buffer occupancy of a first acceleration component from among the set of the acceleration components meeting a predetermined criterion, generate a first penalty value for the first acceleration component based at least on the first input buffer occupancy associated with the first acceleration component, and compare a second value indicative of an availability of the second acceleration component to receive messages from the host to a second dynamically updated value to determine whether the host can send a next message to the second acceleration component.

The load-balancer may further be configured to, if the second value indicative of the availability of the second acceleration component is greater than the second dynamically updated value, then steer the next message from the host to the second acceleration component. The load-balancer may further be configured to, if the second value indicative of the availability of the second acceleration component is less than or equal to the second dynamically updated value, steer the next message from the host to a third acceleration component selected from among the set of acceleration components, as long as based on a comparison of a third value indicative of an availability of the third acceleration component with a third dynamically updated value, the third acceleration component is determined to be in a healthy state.

The first dynamically updated value may comprise a first value of a first free running counter managed by a load-balancer, and the second dynamically updated value may comprise a second value of a second free running counter managed by the load-balancer. The load-balancer may further be configured to periodically decrement the first penalty value by a specified value. The first penalty value may comprise at least a fixed penalty value equal to a high occupancy threshold associated with the first input buffer occupancy.

In yet another example, the present disclosure relates to a method in a system comprising a host configured to send messages, corresponding to a service, to any of a set of acceleration components. The method may include tracking an input buffer occupancy and a processing rate corresponding to each of the set of acceleration components. The method may further include the host initiating a transmission of a first message to a first acceleration component selected from among the set of acceleration components as long as, based on a comparison of a first value indicative of an availability of the first acceleration component with a first dynamically updated value, the first acceleration component is determined to be in a healthy state. The method may further include, upon a first input buffer occupancy of the first acceleration component meeting a predetermined criterion, generating a first penalty value for the first acceleration component based at least on the first input buffer occupancy and a first processing rate associated with the first acceleration component, and comparing a second value indicative of an availability of a second acceleration component to receive messages from the host to a second dynamically updated value to determine whether the host can send a next message to the second acceleration component.

The method may further include, if the second value indicative of the availability of the second acceleration component is greater than the second dynamically updated value, then steering the next message from the host to the second acceleration component. The method may further include, if the second value indicative of the availability of the second acceleration component is less than or equal to the second dynamically updated value, steering the next message from the host to a third acceleration component selected from among the set of acceleration components as long as, based on a comparison of a third value indicative of an availability of the third acceleration component with a third dynamically updated value, the third acceleration component is determined to be in a healthy state.

The first dynamically updated value may comprise a first value of a first free running counter managed by a load-balancer, and the second dynamically updated value may comprise a second value of a second free running counter managed by the load-balancer. The method may further include periodically decrementing the first penalty value by a specified value. The first penalty value may comprise a fixed penalty value equal to a high occupancy threshold associated with the first input buffer occupancy.

It is to be understood that the systems, methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a system comprising a host configured to send messages, corresponding to a service, to any of a set of acceleration components, the method comprising:
    tracking an input buffer occupancy corresponding to each of the set of acceleration components; and
    upon a first input buffer occupancy of a first acceleration component from among the set of the acceleration components meeting a predetermined criterion, generating a first penalty value for the first acceleration component based at least on the first input buffer occupancy associated with the first acceleration component, and comparing a second value indicative of an availability of the second acceleration component to receive messages from the host to a second dynamically updated value to determine whether the host can send a next message to the second acceleration component.

2. The method of claim 1 further comprising, if the second value indicative of the availability of the second acceleration component is greater than the second dynamically updated value, then steering the next message from the host to the second acceleration component.

3. The method of claim 1 further comprising, if the second value indicative of the availability of the second acceleration component is less than or equal to the second dynamically updated value, steering the next message from the host to a third acceleration component selected from among the set of acceleration components as long as, based on a comparison of a third value indicative of an availability of the third acceleration component with a third dynamically updated value, the third acceleration component is determined to be in a healthy state.

4. The method of claim 1 further comprising periodically decrementing the first penalty value by a specified value.

5. The method of claim 1, wherein the first penalty value comprises a fixed penalty value equal to a high occupancy threshold associated with the first input buffer occupancy.

6. The method of claim 1; wherein the first penalty value comprises a sum of a fixed penalty value and the first input buffer occupancy in bytes.

7. The method of claim 1; wherein the first penalty value comprises one of: a sum of a fixed penalty and the first input buffer occupancy multiplied by two, the sum of the fixed penalty and the first input buffer occupancy multiplied by sixteen, the sum of the fixed penalty and the first input buffer occupancy multiplied by sixty-four.

8. The method of claim 3; wherein the second dynamically updated value comprises a first value of a first free running counter managed by a load-balancer, and wherein the third dynamically updated value comprises a second value of a second free running counter managed by the load-balancer.

9. A system comprising:
    a set of acceleration components;
    a host, configured to send messages, corresponding to a service, to any of a set of acceleration components; and
    a load-balancer configured to: (1) track an input buffer occupancy corresponding to each of the set of acceleration components, (2) upon a first input buffer occupancy of a first acceleration component from among the set of the acceleration components meeting a predetermined criterion, generate a first penalty value for the first acceleration component based at least on the first input buffer occupancy associated with the first acceleration component, and compare a second value indicative of an availability of the second acceleration component to receive messages from the host to a second dynamically updated value to determine whether the host can send a next message to the second acceleration component.

10. The system of claim 9, wherein the load-balancer is further configured to, if the second value indicative of the availability of the second acceleration component is greater than the second dynamically updated value, then steer the next message from the host to the second acceleration component.

11. The system of claim 9, wherein the load-balancer is further configured to, if the second value indicative of the availability of the second acceleration component is less than or equal to the second dynamically updated value, steer the next message from the host to a third acceleration component selected from among the set of acceleration components, as long as based on a comparison of a third value indicative of an availability of the third acceleration component with a third dynamically updated value, the third acceleration component is determined to be in a healthy state.

12. The system of claim 9, wherein the load-balancer is further configured to periodically decrement the first penalty value by a specified value.

13. The system of claim 9, wherein the first penalty value comprises at least a fixed penalty value equal to a high occupancy threshold associated with the first input buffer occupancy.

14. The system of claim 11, wherein the second dynamically updated value comprises a first value of a first free running counter managed by a load-balancer, and wherein the third dynamically updated value comprises a second value of a second free running counter managed by the load-balancer.

15. A method in a system comprising a host configured to send messages, corresponding to a service, to any of a set of acceleration components, the method comprising:
- tracking an input buffer occupancy and a processing rate corresponding to each of the set of acceleration components;
- the host initiating a transmission of a first message to a first acceleration component selected from among the set of acceleration components as long as, based on a comparison of a first value indicative of an availability of the first acceleration component with a first dynamically updated value, the first acceleration component is determined to be in a healthy state; and
- upon a first input buffer occupancy of the first acceleration component meeting a predetermined criterion, generating a first penalty value for the first acceleration component based at least on the first input buffer occupancy and a first processing rate associated with the first acceleration component, and comparing a second value indicative of an availability of a second acceleration component to receive messages from the host to a second dynamically updated value to determine whether the host can send a next message to the second acceleration component.

16. The method of claim 15 further comprising, if the second value indicative of the availability of the second acceleration component is greater than the second dynamically updated value, then steering the next message from the host to the second acceleration component.

17. The method of claim 15 further comprising, if the second value indicative of the availability of the second acceleration component is less than or equal to the second dynamically updated value, steering the next message from the host to a third acceleration component selected from among the set of acceleration components as long as, based on a comparison of a third value indicative of an availability of the third acceleration component with a third dynamically updated value, the third acceleration component is determined to be in a healthy state.

18. The method of claim 15 further comprising periodically decrementing the first penalty value by a specified value.

19. The method of claim 15, wherein the first penalty value comprises at least a fixed penalty value equal to a high occupancy threshold associated with the first input buffer occupancy.

20. The method of claim 17, wherein the second dynamically updated value comprises a first value of a first free running counter managed by a load-balancer, and wherein the third dynamically updated value comprises a second value of a second free running counter managed by the load-balancer.

* * * * *